United States Patent
Sardari et al.

(10) Patent No.: US 12,271,746 B1
(45) Date of Patent: Apr. 8, 2025

(54) MODEL-BASED PERSONALIZATION ARCHITECTURE

(71) Applicant: Block, Inc., Oakland, CA (US)

(72) Inventors: Mohsen Sardari, Burlingame, CA (US); Anna Bloom, Park City, UT (US); Jonathan Lamberts, Denver, CO (US); Ran Lin, Foster City, CA (US); Khilesh Mistry, Oakland, CA (US); Sagnik Mazumder, Belmont, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/970,392

(22) Filed: Oct. 20, 2022

(51) Int. Cl.
  *G06F 9/451*   (2018.01)
  *G06Q 20/32*   (2012.01)

(52) U.S. Cl.
  CPC ......... *G06F 9/453* (2018.02); *G06Q 20/3276* (2013.01)

(58) Field of Classification Search
  CPC .................................................. G06F 16/9535
  See application file for complete search history.

(56) References Cited

U.S. PATENT DOCUMENTS

| | | | |
|---|---|---|---|
| 10,475,008 B1 * | 11/2019 | Gedrich | G07F 19/203 |
| 10,846,106 B1 | 11/2020 | Curic et al. | |
| 2015/0059002 A1 * | 2/2015 | Balram | G06F 3/011 |
| | | | 726/28 |
| 2016/0307278 A1 * | 10/2016 | Lipka | G06Q 30/0201 |
| 2017/0228674 A1 * | 8/2017 | Budde | G06Q 10/0635 |
| 2018/0130051 A1 * | 5/2018 | Matthews | G06V 10/17 |
| 2020/0081549 A1 * | 3/2020 | Aggarwal | G06F 3/0304 |
| 2021/0319488 A1 * | 10/2021 | Jin | G06Q 30/0206 |
| 2022/0156716 A1 * | 5/2022 | Saniger | G06Q 20/322 |
| 2023/0106289 A1 * | 4/2023 | Maiman | G06F 21/45 |
| | | | 726/5 |
| 2023/0139513 A1 * | 5/2023 | Verma | G06N 5/01 |
| | | | 705/14.54 |
| 2023/0410190 A1 * | 12/2023 | Swaminathan | G06F 3/04815 |

* cited by examiner

*Primary Examiner* — Di Xiao
(74) *Attorney, Agent, or Firm* — Lee & Hayes, P.C.

(57) ABSTRACT

A payment service system receives contextual information regarding an interaction between the payment service and a user device associated with a user. A propensity metric for the user is determined based at least in part on inputting the contextual information into a machine learning (ML) model. Based on the propensity metric, a user interface is dynamically configured to comprise user interface elements arranged in a layout personalized for the user, where a user interface element represents content particular to a service offered by the payment service. Based on receiving an interaction with the user interface element, a booklet is launched corresponding to the service with which the user interface element is associated.

20 Claims, 13 Drawing Sheets

MODEL-BASED PERSONALIZATION ARCHITECTURE

TECHNICAL FIELD

A user device can access various resources, such as software applications or websites, for accomplishing or facilitating various tasks, such as asset transfers, exchanges, transactions, or other asset management operations. In some cases, different users may have different levels of familiarity with different tasks or resources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix, in some cases separated from the instance number by a dash and/or parentheses. The drawings are not to scale.

DETAILED DESCRIPTION

Figure 1:
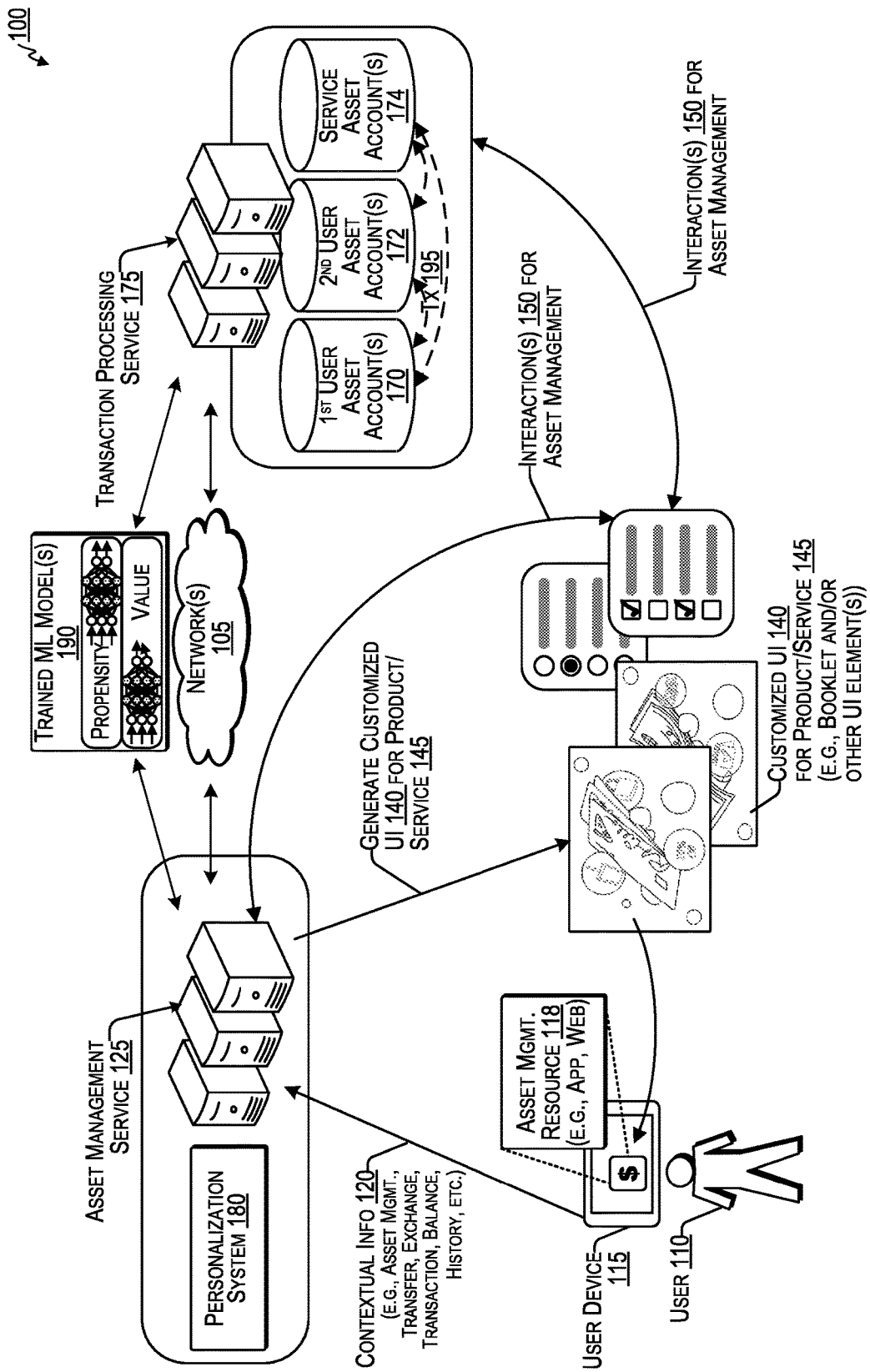
FIG. 1 is a block diagram illustrating an architecture of an asset management service system, in accordance with some examples.

Techniques and systems for generating and/or updating personalized and/or customized user interfaces and/or resources are described herein. In some examples, such user interfaces and/or resources are generated for users who are new to a service provider, and therefore have very little to no data available for use by the service provider (e.g., an asset management service) for personalization and/or customization of the user interfaces and/or resources. In such examples, the service provider can utilize data that it has access to (e.g., user transaction history, user demographic information, user device information, information about user interaction(s) with asset management service(s), information about user interaction(s) with a user device, information about user interaction(s) with specific applications or websites via a user device, information about user interaction(s) with transaction processing service(s), information about user interaction(s) with asset management application(s), information about user interaction(s) with previous user interface elements (e.g., booklets, etc.), and/or information about other users who share characteristic(s) with the user), which can be referred to as "contextual information," and one or more trained machine learned (ML) models to personalize and/or customize the user interfaces and/or resources. In an example, the trained ML models can include a propensity model and/or a value model.

In some examples, such personalization and/or customization can be based, at least in part, on a propensity metric, determined using the propensity model based at least in part on the contextual information associated with a user, indicating a likelihood of the user to adopt, onboard with, and/or use individual products or services. In some examples, such personalization and/or customization can be based, at least in part on, a value metric that is determined using the value model and that indicates value of adoption, by the user, of individual products or services to the service provider. For instance, products or services can include a payment software application, a specialized payment card (e.g., debit and/or credit), a loan, a social media network, a community platform, an event to participate in, a peer-to-peer (P2P) transaction platform, a customer-merchant transaction platform, a recommendation service, a banking service, a checking service, a savings service, an investment service, a cryptocurrency management service, a digital asset (e.g., non-fungible token (NFT)) management service, and the like. As such, using techniques described herein, the service provider can use ML model(s)—such as the propensity and/or value models described above—to offer personalization and/or customization for users in ways that are likely to drive adoption of relevant products and/or services by the users and provide value to the service provider.

The propensity and/or value metrics can be output based on one or more indicators or signals of the contextual information. In some examples, the personalization and/or customization can be driven by contextual information that may not be directly accessible to the service provider, thus providing the benefits of customization and personalization without compromising the user's privacy or security. In some examples, different sets of contextual information can be analyzed by the models depending on individual users. As an example, for a new user that is onboarding with the service provider, the service provider may have very little, if any information, for the new user (e.g., "cold start") and, accordingly, the propensity and/or value metrics may be generated based on a limited set of data, such as internet protocol (IP)-based signals (e.g., regarding past transactions, linked instruments (e.g., payment cards), fraud events, contact book signals, device signals, or the like). In some examples, if the service provider is determining a propensity and/or value metric for an existing user (e.g., "warm start"), the models may consider the above-referenced indicators and signals and additional or alternative indicators or signals in the contextual information. For example, the models can generate the propensity and/or value metrics based on location data (e.g., home and current location), transaction data indicating product or service or app usage (e.g., of the user), interaction data indicating application or web page usage (e.g., of the user), onboarding signals, contact book signals, and the like. In some examples, the service provider can further consider indications of previous user interface elements (e.g., booklets) that have caused the user to try or use a corresponding product or service, indications of previous user interface elements (e.g., booklets) that have not caused the user to try or use a corresponding product or service, indications of previous user interface elements (e.g., booklets) that have caused other user(s) who share characteristic(s) with the user to try or use a corresponding product or service, indications of previous user interface elements (e.g., booklets) that have not caused other user(s) who share characteristic(s) with the user to try or use a corresponding product or service, other contextual information discussed herein, or combinations thereof).

In some examples, the service provider can generate and/or update user interfaces and/or resources based at least in part on receiving, monitoring, and/or analyzing interaction data of an existing user associated with the service provider. In some examples, such a user interface and/or resource can comprise, or be part of, a "booklet." A booklet, as used herein, can include one or more user interface elements that can educate users, promote a product or service, facilitate a process, or the like based on contextual information about the user's current level of knowledge and understanding about a concept. As an example, a booklet can, for instance, educate the users about a product, a service, a software application, a website, system(s) and/or processes related to any of these. As described above, contextual information can be used to personalize and/or customize, or refine personalization and/or customization of, such user interfaces and/or resources for the user. In some examples, ML model(s) as described above can be used for such personalization and/or customization. In some examples, a propensity and/or value-based metric can be used for such personalization and/or customization. That is, in some examples, the same or similar ML model(s) can be used for generating and/or updating user interfaces and/or resources for existing users and new users.

In at least one example, personalization and/or customization can relate to the configuration of user interfaces, which can be output via one or more mediums, such as graphically via a graphical user interface presented via a display, audibly via a speaker, or the like. That is, in some examples, the layout and/or content of a user interface can be personalized and/or customized for a user based on contextual information associated with the user and/or other users. Layout, for example, can include arrangement of user interface elements such as text font, text size, text quantity (e.g., verbosity), images, image types, image colors, background colors, graphics, characters, headings, tiles, controls, other customizable layout. Content, for example, can include information presented via a user interface. In an example, for a user in a particular geolocation that has transacted with a particular merchant or type of merchant, the service provider can present, via a user interface element, an incentive or a recommendation for a new merchant that is similar to the particular merchant or type of merchant on a user interface presented to the user. Other users that are not in the same geolocation and/or have not transacted with the particular merchant or type of merchant may not receive the same incentive or recommendation. As such, a user interface presented to the other users may look different than the one presented to the user (e.g., it may not have the user interface element associated with the incentive or recommendation) and/or may have different content to present (e.g., an incentive or recommendation for a different merchant). In another example, a user known to have a particular goal (e.g., user-designated or implied via interaction data) can have a particular product (e.g., savings or investing) recommended to them via a user interface, wherein a user with a different goal may have a different product (e.g., credit building) recommended to them. As such, a user interface may be configured differently and/or have different content relating to the different products when presented to the different users.

In some examples, user interfaces can present or enable access to resources, such as workflows, booklets, etc. A "resource" for the purpose of this discussion can be one or more user interface elements that relate to a particular product or service. In some examples, a resource can be output via a display, speaker, or the like. In some examples, a resource can be a website or set of websites accessible via at least one web server. In some examples, a resource can be an application that provides access to a service, such as an asset management service or a transaction processing service. In some examples, a resource can be a series of user interface elements and/or user interfaces, presented in a particular order, that guide onboarding, provide education, enable account configuration, or the like. In some examples, resources can be interactive such that a user can interact with individual of the user interface elements and/or the user interface presenting a resource. In some examples, systems and methods described herein can be used to personalize and/or customize which resources are presented to users, when resources are presented to users, content in resources presented to users, and/or the like. In some examples, a resource can be presented via an applet that is specific to a particular product or service. In some examples, personalization and/or customization can include personalization and/or customization of a booklet as well as resources and/or user interfaces corresponding to the booklet. For instance, a booklet can be customized to educate a user about cryptocurrencies and blockchain systems based on the user's current level of knowledge about cryptocurrencies and blockchain systems (e.g., as determined based on contextual information), and user interfaces can be customized to provide options and/or functions to the user based also on the contextual information.

Existing techniques for generating and presenting user interfaces can be static, rigid, and impersonal. Techniques described herein offer an improvement on such existing techniques. For example, techniques described herein utilize contextual information to generate and/or update user interfaces so that the layout and/or content presented via user interfaces is personalized and/or customized for the user. In some examples, techniques described herein can analyze contextual information associated with a user, for example using rule(s), heuristic(s), ML model(s), and/or the like, to intelligently determine what content to present to the user and in which layout. In some examples, techniques described herein can utilize rule(s), heuristic(s), ML model(s), and/or the like to intelligently select and/or generate booklets, as described herein. In some examples, such selection and/or generation can be automatic, that is, without input from the user at the time of such selection and/or generation. In this way, techniques described herein enable dynamic, flexible, and more personal generation and/or presentation of user interfaces. Personalized and/or customized user interfaces and/or resources, for new or existing users, can provide time-sensitive, relevant information to users, thereby enabling users to access data quickly and without, or with reduced, need for extensive scrolling, clicking, or other interactions that utilize computing resources to receive and respond thereto. This reduces computational resources by reducing the number of calls, data exchanges, and/or the like used in response to such clicking, scrolling, or other navigation.

In some examples, and as described above, techniques described herein address a "cold start problem," wherein the service provider does not have enough information to effectively generate recommendations with respect to layout and/or content due to the amount of information available to the service provider when a new user onboards. In some examples, the systems and techniques described herein obtain preliminary contextual information from the new user's device, such as transaction signals, instrument link signals, fraud event signals, contact book signals, and/or device signals. One or more of these signals may be internet protocol (IP)-based signals. The systems and techniques described herein can modify initial settings (or "default" settings) for a user interface based on this preliminary contextual information for preliminary customization and/or personalization of booklets and UI elements. As more contextual information is obtained about the user (e.g., as a transaction history of transactions involving the user develops), the contextual information can grow and evolve, the systems and techniques described herein can continue to modify the settings based on the growing and evolving contextual information, customizing user interfaces in new ways. In this way, the systems and techniques described herein provide for customization and/or personalization for a user even from a cold start, and continue to improve the customization and/or personalization as more contextual information is gathered about the user. That is, techniques described herein enable constant updates to content and/or resources that are availed to users based on contextual information obtained overtime.

In some examples, techniques described herein address an Internet-centric problem in existing techniques that relates to the presentation of time-sensitive data even when the user mobile device is offline, for instance by activating a local application on the user mobile device when an asset management system and/or the user mobile device come online, and/or by causing the asset management system and/or the user mobile device to come online and activate the local application. The systems and techniques described herein can further address this problem by bringing the local application on the user mobile device from the background or closed state to a foreground state, which can be referred to as surfacing the local application.

In some examples, integrations and/or synergies between system components can enable techniques and systems described herein to provide additional technical improvements to system efficiency. For example, in some examples, the techniques and systems described herein further provide automated designing, creating, and importing data into a viewable form, such as a form associated with onboarding a user onto a product or service, from outside applications such as the various sources of contextual information described herein (e.g., the user's mobile device, a mobile device of another user with whom the user performs a P2P transaction, a merchant POS terminal, servers of a asset management resource, servers of a transaction processing resource, and the like), for instance by deriving the context of the imported data and formatting or processing the data into a form that is contextually relevant. The techniques and systems described herein can automatically populate relevant fields the viewable forms with such data based on comparison of context information in the data with context information (e.g., field names) in the viewable forms to ensure that the forms are populated correctly. The techniques and systems described herein can therefore provide improved importation of data and interoperability with third-party software, and can provide improved efficiency in use of software, websites, and/or other resources by bypassing manual form entry of data that is automatically imported and/or populated into the forms.

In some examples, techniques described herein address challenges with customization and/or personalization by using trained machine learning (ML) models, such as neural networks, gradient boosting regressors, random forests, and the like. For instance, the techniques and systems described herein can train and use a propensity model to generate a propensity metric for a user indicating a likelihood of the user to adopt, onboard with, and/or use individual products or services. The techniques and systems described herein can train and use a value model to generate a value metric for a user indicating value of adoption, by the user, of individual products or services to the service provider. These models can be trained in multiple stages using different training sets at each stage, and can for instance evolve with each new customization of a user interface based on an evaluation of how effective the user interface customization was (e.g., based on the user's interaction(s) with the customized user interface or lack thereof). The models themselves can be used to identify which products or services should be introduced to the user, and/or which customizations should be applied to booklets and/or user interfaces for the user, allowing for multiple levels of customization and corresponding reinforcement model training and/or reinforcement. In some examples, the techniques described herein use propensity models and/or value models designed for predicting each user's product adoption propensity and future profit during or after customer onboarding stage to pick the top products and/or services to educate the user about, for instance by ranking propensity and/or value metrics for each user and product pair and selecting the pair with the highest value.

In some examples, the techniques and systems described herein address problems with centralized systems by providing decentralized and/or distributed systems for customization and/or personalization of user interfaces, such as booklets and other user interface elements. For instance, the techniques and systems described herein carve out a specific location for a customization (e.g., server(s) of an asset management system) based on contextual information that may be stored remotely from the user's own device, but that provide the basis for customized user interfaces that are provided to the user's device. This customization, and any corresponding asset transactions, transfers, or other management operations can be performed using decentralized and/or distributed systems, allowing for improved efficiencies through load distribution, for instance allowing transaction processing service systems to process a transaction corresponding to a first user interface interaction while asset management service systems customize a second user interface.

In some examples, the techniques and systems described herein address efficiency problems with user interfaces by customizing interfaces to reduce how many steps, pages, operations, or interfaces are to be presented to a user via a user interface for the user device to perform a particular function, such as initiating an asset transfer, transaction, or other asset management operation. For instance, if the techniques and systems described herein determine that a user is already experienced with a particular product or service, such as one related to management of cryptocurrencies, the techniques and systems can customize the user's interface to skip certain interface elements and jump straight to operations or functions that the user has performed before or is otherwise likely to want to perform based on contextual information. Such improvements to user interface efficiency can also reduce bandwidth usage and conserve data storage, processing power, and other computational resources, for instance by not using computational resources on the skipped interface elements.

Various aspects of the application will be described with respect to the figures. FIG. 1 is a block diagram illustrating an architecture of an asset management system 100. The asset management system 100 includes a user device 115 associated with a user 110. The user 110 may be referred to as a payor, a user, a transferor, a transferor user, a transferee, transferee user, a payee, a user, a transferor, a transferor user, a transferee, and/or a transferee user.

The asset management system 100 includes an asset management service 125 with one or more servers. The asset management system 100 includes a transaction processing service 175 with one or more servers. The asset management service 125 and the transaction processing service 175 may be communicatively coupled to each other and/or to one or more user devices (e.g., the user device 115) through one or more networks 105, which may include one or more local area networks (LAN), one or more wireless local area networks (WLAN), one or more intranets, the Internet, one or more cellular networks, or a combination thereof.

The asset management service 125 of the asset management system 100 m can include a personalization system 180 that generates, selects, and/or otherwise personalizes an interactive customized user interface (UI) 140, which may include a booklet and/or other UI element(s)). The booklet can include information about a product or service 145, such as a product or service 145 associated with an asset transaction management process, and can facilitate the asset transaction management process via interaction(s) 150 with server(s) of a transaction processing service 175, as is illustrated in FIG. 1. The generation of the customized UI 140 and processing process by the personalization system 180 begins with the user device 115 accessing a user instance of the asset management resource 118. In some examples, the asset management resource 118 is a software application associated with a payment service (e.g., with the asset management service 125 and/or the transaction processing service 175). The user device 115 may access (e.g., download from an application repository, install, launch, run, start, execute, transition from running as a background process to running as a foreground process, and/or otherwise access) the user instance of the asset management resource 118. In some examples, the asset management resource 118 is a website or other online portal associated with a payment service (e.g., with the asset management service 125 and/or the transaction processing service 175) and accessible to the user device 115 through a browser software application running on the user device 115, as in a user interface displayed on the user device 115. In some examples, the asset management resource 118 is a combination of application, website, online portal, and/or other resource having one or more user interfaces.

The asset management service 125 receives and/or generates contextual information 120 regarding the user 110, the user device 115, and/or at least one interaction between the asset management service 125 and the user device 115. Based on the contextual information 120, the personalization system 180 of the asset management service 125 generates a customized UI 140 that is personalized, tailored, and/or customized to the user 110. The customized UI 140 can include information about a product or service 145 in the booklet and/or the other UI elements, for instance to educate the user 110 about the product or service 145 and/or to provide options for different operations and/or functions that the user can perform to onboard onto and/or use the product or service 145. The level of detail of the information about the product or service 145 in the customized UI 140 can depend on how educated and/or experienced the user 110 is with the product or service 145, which in some examples, can be based on the contextual information 120. For instance, if the contextual information 120 indicates that the user 110 is inexperienced with a particular product or service 145 (e.g., has not used the product or service 145 before), the personalization system 180 of the asset management service 125 can generate the customized UI 140 to include more detail to educate the user 110. On the other hand, if the contextual information 120 indicates that the user is experienced with a particular product or service 145 (e.g., has used the product or service 145 often), the personalization system 180 of the asset management service 125 can generate the customized UI 140 to be more compact and efficient, omitting some of the detail that might otherwise be included, and, in some cases, omitting entire interfaces, based on the user 110 already being experienced, and in some cases based on automatic filling of fields based on information (e.g., transaction information) previously entered or selected by the user 110. The customized UI 140 can include a user interface giving the user 110 options for how to initiate the product or service 145, and/or for information to provide to the product or service 145.

The contextual information 120 can include information about the user 110, the user device 115, the asset management resource 118, the asset management service 125, the transaction processing service 175, or a combination thereof. For instance, the contextual information 120 can include, for instance, user identifying information (e.g., a name, a username, an image, a phone number), user device 115 information, a trust signal the user (e.g., ratings and/or reviews for the user, indications of fraud or other events relating to trust), user demographic information, information indicting user interactions with the asset management resource 118 and/or the asset management service 125, information indicting user interactions with the asset management resource 118 and/or the asset management service 125, a user transaction history, a user account balance, a user account balance history, a user asset transfer history, a user asset management history, a user purchase history, a user's list of friends, a user's list of contacts, prior booklets (e.g., as in customized UI 140) that the user has received, prior booklets (e.g., as in customized UI 140) that the user has then used the associated product or service 145 based on, prior booklets (e.g., as in customized UI 140) that the user has declined the associated product or service 145 based on, a transaction request, an asset transfer request, an asset management request, any other information (e.g., contextual information 120) about the user 110 and/or user device 115, user asset account(s) 170 associated with the user 110, criteria, rules, thresholds, conditions, or a combination thereof. In some examples, the contextual data In some examples, the contextual information 120 can include internet protocol (IP)-based information, such as an IP-based transaction signal, an IP-based instrument link signal, an IP-based fraud event signal, contact book signals, and/or device signals associated with the interaction between the payment service and the user device 115. In cold-start situations where the user 110 is new to the asset management resource 118 and/or the asset management service 125, the asset management service 125 may have limited access to contextual information 120. That is, the asset management service 125 may have access to less contextual information 120 for a new, onboarding user than an existing, more established user. Still, the personalization system 180 of the asset management service 125 can generate the customized UI 140 based on this contextual information 120, for instance by modifying initial settings (or "default" settings) for a user interface based on the contextual information 120 for preliminary customization and/or personalization of booklets and UI elements.

The user interface of the customized UI 140 can include one or more user interface elements, such as tiles arranged in a layout on the user interface. The user interface elements may correspond to an applet or booklet personalized for the user. In some embodiments, the customized UI 140 includes content particular to a product or service 145. In some examples, the user interface of the customized UI 140 can include other user interface elements providing for the user device 115 with an interface through which various options and settings can be selected for a product or service 145 that the customized UI 140 describes, such as buttons, sliders, radio buttons, text fields, checkboxes, toggles, selectors, links, or combinations thereof. For instance, in FIG. 1, examples of the customized UI 140 are illustrated as including various graphics, text, and interfaces with radio buttons and checkboxes, respectively. The asset management service 125 can customize the customized UI 140 to the user 110 based on the contextual information 120, selecting appropriate interface elements to allow for interactions(s) 150 with the asset management service 125 and/or the transaction processing service 175 that are determined based on the contextual information 120.

The personalization system 180 of the asset management service 125 can personalize the customized UI 140 to the user 110 by setting or modifying content of the customized UI 140 (e.g., topics, product(s) or service(s) 145, UI element(s) of the customized UI 140, etc.), a UI format, the means with which the UI is presented, a level of positivity in the customized UI 140 (e.g., encouraging the product or service 145 as having a positive effect on the user's life), a level of urgency-based communication in the customized UI 140 (e.g., encouraging the user to act now before an offer for the product or service 145 expires), a level of "premium" messaging in the customized UI 140 (e.g., presenting the product or service 145 as premium, elite, limited, or luxurious), specific dominant colors used in the customized UI 140 (e.g., background colors, foreground colors), image types (e.g., different image sizes or dimensions), text length (e.g., shorter than a text length threshold for users with little time, longer than a text length threshold for users who prefer more detail), image content (e.g., preference for seeing portraits of people vs. images that depict no people), inclusion of a video, content of the video (e.g., whether the video depicts people or not), type of booklet (e.g., upselling or promoting, purely educational, etc.), incentives offered by the customized UI 140 (e.g., free cash, stocks, coupons, discounts, offers, and/or other incentives), a user interface type of the customized UI 140 (e.g., touchscreen, keyboard, or mouse-based based on the type of the user device 115), user interface options provided in the user interface of the customized UI 140 (e.g., based on the capabilities and preferences of the user 110), user interface organization for the user interface in the customized UI 140, or a combination thereof. The personalization system 180 of the asset management service 125 can personalize any of these aspects of the customized UI 140, and any other aspects of the customized UI 140 discussed further herein, based on the contextual information 120.

In some examples, the customized UI 140 can be customized with respect to which products or services are presented to the user 110, which can be based on contextual information 120, the propensity and/or value metrics, and/or the like. As such, the configuration of the customized UI 140 can present user interface elements representative of particular products or services that the user 110 is mostly likely to use (e.g., based on the propensity metric) and/or is likely to be the most valuable to the asset management service 125 (e.g., based on the value metric) instead of other products or services that the user 110 is less likely to use and/or is likely to be less valuable to the asset management service 125. In some examples, the customized UI 140 can be customized with respect to how products or services are presented to the user 110, which can be based on contextual information 120, the propensity and/or value metrics, and/or the like. In some examples, the configuration of the customized UI 140 can cause high propensity and/or value products and/or services (e.g., associated with respective metric(s) above a threshold) to be presented in a prominent position on the customized user interface, with a larger size relative to low propensity and/or value products and/or services (e.g., associated with respective metric(s) below a threshold), with an animation, with a booklet, with an incentive, and/or the like to draw attention to such products and/or services. In some examples, content of user interface elements can further be configured based on the contextual information 120, the propensity and/or value metrics, and/or the like. For instance, a user who owns cryptocurrency or stocks may be presented with a booklet related to automating buying and/or selling cryptocurrency and/or stocks whereas a user who does not own either may be presented with a booklet educating the user on cryptocurrency and stocks or an onboarding flow to make their first purchase. As another example, a user who has configured a payment instrument may be presented with a user interface element associated with an incentive redeemable by using the payment instrument, whereas as user who has not yet configured a payment instrument may be presented with a user interface element associated with a booklet for educating them on configuring the payment instrument.

As more contextual information 120 is obtained about the user (e.g., as a transaction history of transactions involving the user develops through more use of the asset management resource 118 and/or the asset management service 125), the contextual information can grow and evolve, the personalization system 180 of the asset management service 125 can continue to modify the settings based on the growing and evolving contextual information 120, customizing and personalizing the customized UI 140 further. In some examples, the contextual information 120 can include user preference inferences from engagement with the asset management resource 118, the asset management service 125, and/or the transaction processing service 175, such as information about the interaction(s) 150, what types of products or services the user 110 has used, what types of booklets or applets the user 110 has interacted with, a preference for booklets or applets with positive messages, urgency-based messages, "premium" messaging, specific dominant colors, image types, text length, attention span, image content (e.g., preference for seeing images with people vs images without people), inclusion of a video, type of booklet (upselling, purely educational, etc.), incentive offered by the booklet (e.g., free cash or stocks), or combinations thereof. Additionally and/or alternatively, in some examples, the contextual information 120 can include indications of user interest in one or more specific subjects, such as purchase history (e.g., associations of user 110 email addresses to sellers, social network post content from the user 110 or friends of the user 110, degrees of separation between the user 110 and another user interested in an offered service, amount of disposable income of the user 110, or combinations thereof. The personalization system 180 of the asset management service 125 can generate the customized UI 140 based on the contextual information 120, for instance using the various preferences and inferences to personalize the customized UI 140 to the user 110.

In some examples, the contextual information 120 can include information about booklet options or types (e.g., based on previous booklets that the user 110 has viewed) that the user 110 has viewed or accessed for more than a threshold amount of time (e.g., 10 seconds, 20 seconds, 30 seconds, or some other threshold amount). In some examples, only such threshold-exceeding views count as views of the corresponding booklet by the user 110. In some examples, such threshold-exceeding views are weighted higher than views for less than the threshold amount of time, and therefore count for more when counting views of the corresponding booklet by the user 110. Multiple thresholds can be used, with higher thresholds corresponding to higher weights. In some examples, the personalization system 180 of the asset management service 125 can generate and/or select the customized UI 140 based on view data for previous booklets captured, measured, and/or weighted in this way. In some examples, the contextual information 120 can include similar information about views and/or usages of products or services through corresponding booklets, counting the user viewing and/or accessing the product or service 145 corresponding to the customized UI 140 as discussed above based on whether the user 110 accesses or uses the product or service 145 for more than a threshold amount of time. The personalization system 180 of the asset management service 125 can generate and/or select the customized UI 140 based on such view information about products or services.

The product or service 145 offered by the customized UI 140, and for which the UI elements of the customized UI 140 can control interaction(s) 150, may include payment software application, a specialized payment card (e.g., debit and/or credit), a loan, a social media network, a community platform, an event to participate in, a peer-to-peer (P2P) transaction platform, a customer-merchant transaction platform, a recommendation service, a banking service, a checking service, a savings service, an investment service, a cryptocurrency management service, a digital asset (e.g., non-fungible token (NFT)) management service, and the like. In an illustrative example, the product or service 145 can include a secure transfer (e.g., exchange) of one or more assets between accounts. In some examples, at least part of the secure transfer can include a transfer 195 between accounts (e.g., between the user asset account(s) 170 of the user 110, the second user asset account(s) 172 of the user 110 or of a second user, and/or the service asset account(s) 174 of the transaction processing service 175 and/or the asset management service 125) facilitated and/or processed by the server(s) of the transaction processing service 175. In some examples, at least part of the secure transfer can include a transfer 195 between the user 110 and a second user physically, for instance for a transfer 195 of physical assets such as bills or coins of a fiat currency (e.g., US dollars, Euros, UK Pounds, Japanese Yen, Chinese Yuan, etc.), gift cards, other payment cards, other payment objects, or other physical objects.

In some embodiments, the user device 115 uses the user instance of the asset management resource 118 to send an asset management request to the server(s) of the asset management service 125 and/or to request that the server(s) of the asset management service 125 in response to receiving an indication of an interaction with a tile and/or associated booklet. The server(s) of the asset management service 125 receive the asset management request from the user device 115 (e.g., from the user instance of the asset management resource 118). The asset management request may be an example of the contextual information 120. The interaction with the tile or other UI element of the customized UI 140 may trigger interaction(s) 150 with the asset management service 125 and/or the transaction processing service 175 for asset management (e.g., onboarding, transfers, transactions, exchanges, purchases, sales, loans, other products or services discussed herein, or a combination thereof).

In some examples, one or more trained machine learning (ML) models 190 can determine, based on an analysis of the contextual information 120 about user 110, a propensity metric, a value metric, or both for the user 110. For instance, the server(s) of the asset management service 125 can input, to the trained ML model(s) 190, contextual information 120 about the user 110, information about the user device 115, and/or information about the context data (e.g., internet protocol (IP)-based transaction signals, IP-based instrument link signals, IP-based fraud event signals, social media signals, contact book signals, and/or device signals etc. associated with the interaction between the payment service and the user device 115). The trained ML model(s) 190 can determine one or more product propensity models that predict the specific user's 110 likelihood of using a certain product at any time in the user's 110 lifecycle based on contextual information 120 about the user 110.

The trained ML model(s) 190 can run on, and/or be a part of, the server(s) of the asset management service 125, the server(s) of the transaction processing service 175, the user device 115, one or more network server(s) of the network(s) 105, or a combination thereof. The trained ML model(s) 190 can include, for instance, or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more trained support vector machines (SVMs), one or more trained random forests (RFs), one or more gradient boosting regressors, one or more encoders, one or more decoders, one or more deep learning systems, or combinations thereof. The trained ML model(s) 190 can be trained using the training data using supervised learning, unsupervised learning, or a combination thereof. The training data can include selections made in various situations, along with corresponding information (e.g., see examples of input information to the trained ML model(s) 190 and/or context data described herein) about the situations. An illustration of the trained ML model(s) 190 in FIG. 1 illustrates the input layer(s) of the trained ML model(s) 190 as a column of white circles on the left-hand side of the illustration, the output layer(s) of the trained ML model(s) 190 as another column of white circles on the right-hand side of the illustration, and the hidden layers of the trained ML model(s) 190 as two columns of grey-shaded circles in between the input layer(s) and the output layer(s). The circles can represent neurons, channels, layers, filters, pooling layers, normalization layers, maps, parameters, other elements of the trained ML model(s) 190, or combinations thereof. In some examples, the trained ML model(s) 190 include one or more trained ML models that are personalized to a specific user (e.g., the user 110 and/or the second user 160) by being trained based on data that is specific to that specific user. In some examples, the trained ML model(s) 190 include one or more trained ML models that are generalized for multiple users by being trained based on data specific to various users and/or simulated data for simulated users.

The trained ML model(s) 190 can be used by the personalization system 180 of the asset management service 125 to generate the customized UI 140 based on the contextual information 120. In some examples, the trained ML model(s) 190 includes a propensity model indicative of whether the user 110 is likely to try, onboard with, and/or use a product or service 145 based on the customized UI 140. The propensity model can generate a propensity metric that the personalization system 180 of the asset management service 125 and/or the trained ML model(s) 190 can further use to generate the customized UI 140, for instance to set a level or type of persuasiveness of the customized UI 140 based on the propensity metric. The propensity model can generate the propensity metric based on indicators of propensity (which can be referred to as propensity signals) in the contextual information 120, as described above.

In some examples, the trained ML model(s) 190 can include a value model indicative of how much value the user 110 is to bring through use of the product or service 145 (e.g., monetary value and/or value with respect to bringing in other users to the product or service 145) based on the customized UI 140. The value model can generate a value metric that the asset management service 125 and/or the trained ML model(s) 190 can further use to generate the customized UI 140, for instance to indicate that the user 110 would be a valued user of the product or service 145 based on the value metric. The value model can generate the value metric based on indicators of value (which can be referred to as value signals), as described above.

The trained ML model(s) 190 can be trained to generate the customized UI 140 in response to input of the contextual information 120, the propensity metric, the value metric, or a combination thereof to the trained ML model(s) 190. The trained ML model(s) 190 can be previously trained to generate the customized UI 140 by the server(s) of the asset management service 125 (e.g., the personalization system 180) or by another computing system, using training data.

The training data may include previously-generated UIs and corresponding contextual information. For instance, the contextual information can include any type of information discussed with respect to the contextual information 120, including, for instance, previous selections of similar UIs from a group of users or the user 110 themselves, previous selections of UIs, services, or other interactive user interface elements with similar characteristics (e.g., positive vs. urgency-based messages, "premium" messaging, specific dominant colors, image types, text length, image content, inclusion of a video, type of booklet, incentive offered by the booklet, etc.), or combinations thereof. The propensity model can be trained by the asset management service 125 based on training data that includes pre-determined propensity metrics and corresponding propensity signals. The value model can be trained by the asset management service 125 based on training data that includes pre-determined value metrics and corresponding value signals.

In some examples, once the server(s) of the asset management service 125 (e.g., the personalization system 180) selects and/or generates the customized UI 140 to present on the user interface (e.g., selected from a broader set of UIs or generated), either using the trained ML model(s) 190 as described or otherwise as described herein, the trained ML model(s) 190 can be updated (e.g., by the server(s) of the asset management service 125 or by another computing system) based on additional training data. The additional training data can identify the UIs that are selected and/or generated, information about the broader set, and contextual information 120 about the user 110 and/or the user device 115.

In some examples, the user 110 can decide to opt into a product or service 145 offered within the customized UI 140. In some examples, the user 110 can interact with a user interface element presented via the customized UI 140 to trigger or otherwise launch an onboarding flow or other flow to enable the user 110 to sign on to or add a product or service 145 to their account. In some examples, such an interaction can launch or otherwise initialize an applet, series of user interfaces, and/or the like to facilitate the onboarding flow or other flow. In some examples, content presented in association with such onboarding or the like can be customized and/or personalized as described above.

As illustrated in FIG. 1, in response to an interaction with an interactive user interface element on the asset management resource 118, the asset management service 125 can initiate currency exchange. For example, to perform the exchange, an amount of a first asset is transferred between the user 110 and a second user in a transfer 195. For example, if the transfer 195 is of a physical asset (e.g., a fiat currency) of the user 110, then the user 110 can give the amount of the physical asset (e.g., the fiat currency) to the second user in the transfer 195, or vice versa. If the transfer 195 is a transfer of a digital asset (e.g., a cryptocurrency, an NFT, or a security asset) of the user 110, then the user 110 can transfer the amount of the digital asset to the second user in the transfer 195, or vice versa. The server(s) of the asset management service 125, and/or the server(s) of the transaction processing service 175, can receive a confirmation that the transfer 195 between the user 110 and the second user has taken place, or some other indication of the transfer 195, from the second user device and/or the user device 115, for instance if the transfer 195 involves a transfer of a physical asset.

To perform the exchange, the server(s) of the transaction processing service 175 can facilitate a transfer 195 of an amount of a second asset between user asset account(s) 170 associated with the user 110 and asset account(s) (e.g., second user asset account(s) 172 and/or service asset account(s) 174) associated with the second user 160 and/or with the transaction processing service 175 itself. For example, if the exchange is an exchange from a physical asset (e.g., a fiat currency) of the user 110 to a digital asset (e.g., a cryptocurrency, an NFT, or a security asset), then the server(s) of the transaction processing service 175 can facilitate the transfer 195 of the amount of the digital asset (e.g., the cryptocurrency, the NFT, or the security asset) to the user asset account(s) 170 associated with the user 110 from the asset account(s) (e.g., second user asset account(s) 172 and/or service asset account(s) 174) associated with the second user 160 and/or with the transaction processing service 175 itself. If the exchange is an exchange from a digital asset (e.g., a cryptocurrency, an NFT, or a security asset) of the user 110 to a physical asset (e.g., a fiat currency), then the server(s) of the transaction processing service 175 can facilitate the transfer 195 of the amount of the digital asset (e.g., the cryptocurrency, the NFT, or the security asset) from the user asset account(s) 170 associated with the user 110 to the asset account(s) (e.g., second user asset account(s) 172 and/or service asset account(s) 174) associated with the second user 160 and/or with the transaction processing service 175 itself. In some examples, the service asset account(s) 174 can be used as escrow account(s) or holding account(s) for the transfer 195 if the transfer 195 is between the user asset account(s) 170 and the second user asset account(s) 172.

The server(s) of the transaction processing service 175 facilitate the transfer 195 based on the server(s) of the transaction processing service 175 having access to various asset accounts, such as the user asset account(s) 170 associated with the user 110, the second user asset account(s) 172 associated with the second user 160, the service asset account(s) 174 associated with the transaction processing service 175 and/or the asset management service 125, or a combination thereof. These asset accounts can be associated with the transaction processing service 175 and/or the asset management service 125, institutions (e.g., banks, credit unions, merchants (for store credit), stockbrokers, stock exchanges, stock trading platforms, currency exchange platforms, retirement account institutions, payment processors, financial institutions, lending institutions, credit institutions, securities institutions, and the like). Any of these asset accounts can be fiat currency accounts that are configured to store amounts of fiat currencies (e.g., the U.S. Dollar ($), the Canadian Dollar, the Euro (€), the Yen (¥), the British Pound (£), and the like) and/or digital indications representing amounts of fiat currencies. Any of these asset accounts can be security asset account(s) that store security assets (e.g., stocks, bonds, investments, debt, equity, warrants, futures, shorts) and/or digital indications representing amounts of security assets. Any of these asset accounts can be cryptocurrency account(s) that store cryptocurrencies (e.g., Bitcoin (₿), Ethereum (ETH), Litecoin (LTC), Cardano (ADA), Dogecoin (DOGE), stablecoins, and the like) and/or digital indications representing amounts of cryptocurrencies. Any of these asset accounts can be NFT account(s) that store NFTs and/or digital indications representing amounts of NFTs. In some examples, the asset management service 125 and/or the transaction processing service 175 can perform a conversion between a first asset and a second asset without accessing external exchanges or services. In some examples, the asset management service 125 and/or the transaction processing service 175 can perform a conversion between a first asset and a second asset by accessing external exchanges or services to determine exchange rates. In some examples, the asset management service 125 and/or the transaction processing service 175 can utilize one or more distributed ledgers to execute and/or store records of an exchange, such as a blockchain ledger, a directed acyclic graph (DAG) ledger, or a combination thereof.

In some examples, the transfer 195 can also be a transfer between account(s) (e.g., the user asset account(s) 170 associated with the user 110, the second user asset account(s) 172 associated with a second user, the service asset account(s) 174 associated with the transaction processing service 175 and/or the asset management service 125) that is facilitated by the server(s) of the transaction processing service 175.

In some examples, the transfer 195 is performed between a customer and a merchant. For instance, in some examples, the user 110 is a customer, the user device 115 is a customer device, the second user is a merchant or a representative of a merchant, and the second user device is a merchant device. For instance, the user 110 (the customer) can provide fiat currency (e.g., paper money) to the second user (the merchant) at a POS terminal, and the second user (the merchant) can provide another asset type (e.g., cryptocurrencies, security assets, NFTs) to the user 110 (the customer) in exchange. In another example, the user 110 is a merchant or a representative of a merchant, the user device 115 is a merchant device, the second user is a customer, and the second user device 165 is a customer device.

In some examples, the exchange (e.g., the transfer 195) is a peer-to-peer exchange. For instance, in some examples, the user 110 is a first peer user, the user device 115 is a first peer user device, the second user is a second peer user, and the second user device is a second peer user device.

Figure 2:
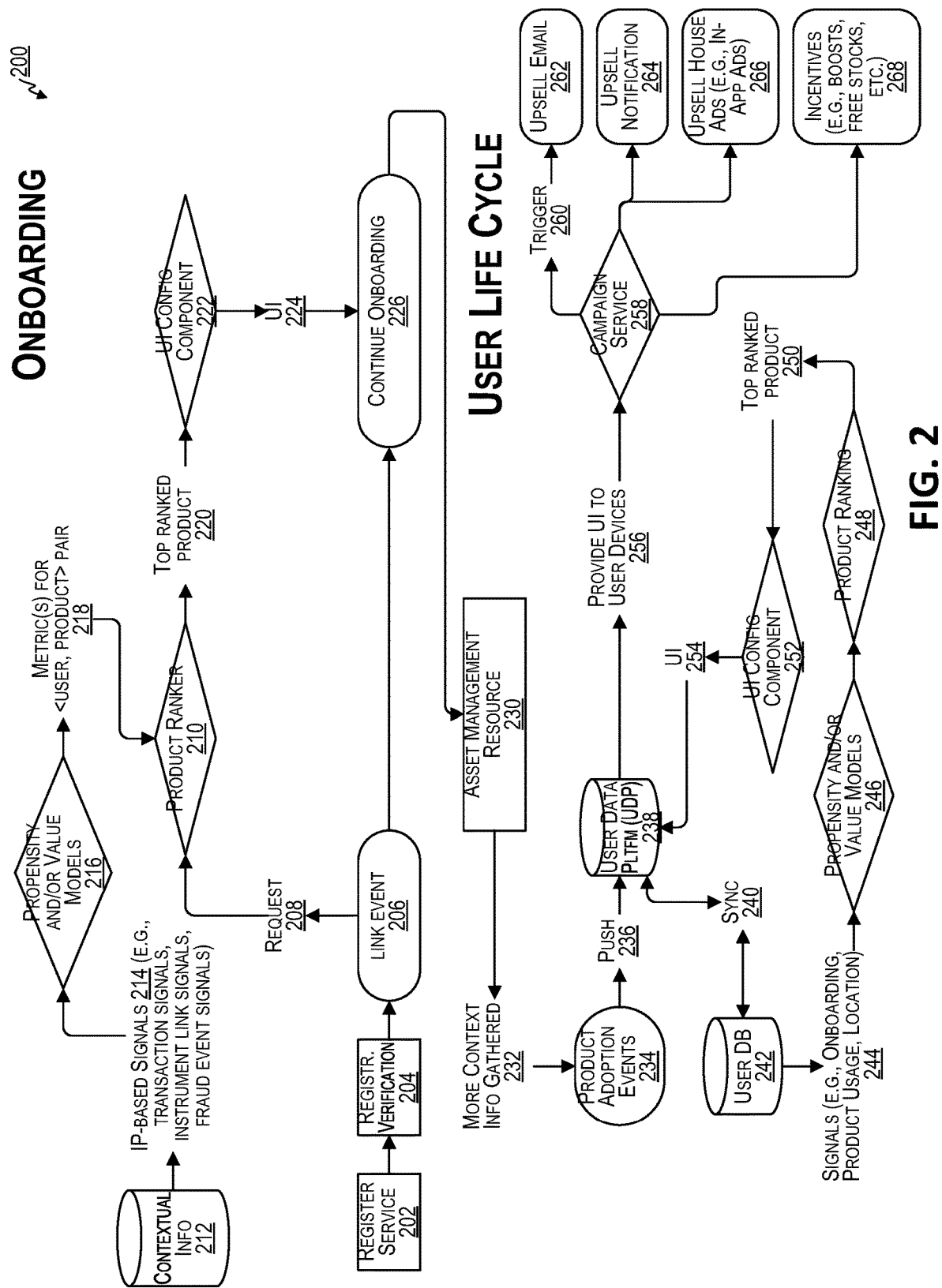
FIG. 2 is a block diagram illustrating a system for user onboarding and lifecycle within an asset management service system, in accordance with some examples.

FIG. 2 is a block diagram illustrating a system 200 for user onboarding and lifecycle within an asset management service system, in accordance with some examples. The system 200 can be part of the asset management service 125, and can be associated with various products or services (e.g., including product the or service 145), and can rank the products or services (e.g., based on propensity and/or value metrics) to select a product or service 145, or set of products or services, to surface to user (e.g., the user 110) as well as various customized UIs (e.g., booklets and/or other portions of a customized UI 140) to surface to the user about the selected product or service 145. The onboarding service begins when a user registers an account in the asset management application (e.g., registers using an identifier, such as email and/or Short Message Service (SMS) information, at register service 202). The registration is verified by the registration verification service 204, which can send verification messages via text/SMS, email, or similar process. Once registration is verified, a link event 206 is generated, which triggers the creation of an account associated with the user. Onboarding is continued.

After the user account is created, a request 208 (e.g., a remote procedure call (RPC)) is sent to the product ranker service 210, which ranks potential product or service offerings according to the value associated with onboarding the user and/or the propensity of a user to try a product. As described above, propensity and/or value models 216 can be used to generate propensity and/or value metrics. Such metrics can be considered by the product ranker service 210, as described below. For example, value assessment includes the scenario that some users do not create enough value to offset onboarding costs (e.g., due to card issuance costs, background and fraud detection costs, ineligibility to qualify for certain services based on tax status, etc.). An estimated value for the product can be determined based on the profit that is likely to be generated by the product offset by the risk assessment. The product ranker service 210 may consider the estimated value in determining how to rank an individual product.

The onboarding propensity models 216 predict an individual user's likelihood of using a certain product and/or service at any time in the user's lifecycle. The onboarding propensity models 216 can be based on a cold start model, which predicts the propensity of a user adopting a product right after the new user creates an account. In the case of a cold start, not much information is known about the new user. Contextual information 212 for a new user regarding an interaction between the payment service and a user device associated with a user can be determined, in some examples, based on an internet protocol (IP)-based signals 214, such as IP-based transaction signals, IP-based instrument link signals, or IP-based fraud event signals, contact book signals, information from a feature store, and/or device signals. Other sources of contextual information 212 can be social media content of the user or friends/family of the user (e.g., posting or sharing about topics related to digital currency may indicate an interest in learning more about digital currency systems and products). Once the onboarding propensity and/or value models 216 receive the contextual information about the new user, the onboarding propensity and/or value models 216 can determine a propensity metric and/or a value metric for the specific user. The propensity metric which can predict a probability that the user will try out, adopt, onboard with, and/or use a specific product or service. The value metric can predict a value that the user can bring to the specific product or service. The onboarding propensity and/or value models 216 can be one or more machine learning (ML) models that, based on the contextual information as input to the ML models, outputs the metric(s) (e.g., propensity metrics and/or value metrics) for the user. For example, the onboarding propensity models 216 can output metric(s) (e.g., a propensity metric and/or a value metric) for each <user, product> pair 218 that the product ranker service 210 can use to rank the product(s) for each of the specific users by predicted propensity and/or value. A top ranked product 220 can be selected by the product ranker service according to the metrics. The top ranked product can be, for instance, the product or service 145 of FIG. 1.

Once a top ranked product is selected, a UI configuration component 222 can configure a UI 224, such as the customized UI 140 in FIG. 1. The UI configuration component 222 can determine how to configure the UI 224, such as which products or services to service, where to surface the, how to surface them, and the like. In at least one example, the UI configuration component 222 can rank, select, generate, and/or customize the UI 224 (e.g., booklets and/or other UI elements) based on topic (e.g., the top ranked product 220) and/or the means with which the UI 224 (e.g., booklet and/or a remainder of the UI 224) is presented, for instance to include booklets and/or applets and/or other UI elements with positive messages, urgency-based messages, "premium" messaging, specific dominant colors, image types, text length, image content (e.g., preference for seeing portraits of people vs no people), inclusion of a video, type of messaging (upselling, purely educational, etc.), incentives offered by the messaging (e.g., free cash or stocks, discounts, or other incentives), any other customization options discussed herein, or a combination thereof. Additionally and/or alternatively, in some examples, the contextual information 120 can include indications of user interest in one or more specific subjects, such as purchase history (e.g., associations of first user 110 email addresses to sellers), social network post content from the first user 110 or friends of the first user 110, degrees of separation between the first user 110 and another user interested in an offered service, amount of disposable income of the first user 110, etc. In some embodiments, the UI elements (e.g., booklets) and/or their characteristics can be ranked and selected (or otherwise generated and/or customized) by the UI configuration component 222 based on one or more ML recommendation models separate from the propensity and value ML models.

Onboarding can continue 226, and the customized UI 140 can be presented via the device of the onboarding user, for example, via an asset management resource 230 (e.g., asset management resource 118). For example, the user interface of the user device can be dynamically configured such that a customized UI 224 (e.g., customized UI 140) is presented as one or more user interface elements arranged in a layout personalized for the user. The customized UI 224 can include content particular to the product or service offered by the payment service (e.g., the top ranked product 220). In embodiments, the customized UI 224 can be presented in association with an applet. A user interface element representative of the applet (e.g., giving access to or otherwise enabling initialization thereof) can be arranged within the user interface in a position that maximizes the likelihood of user interaction. Based on receiving an interaction with the customized UI 224, or a user interface element presented thereby, access to the product or service with which the user interface element is associated can be enabled and/or a process associated with onboarding or performing another action in association with the product or service can be initialized. In an example, interaction associated with a particular user interface element can initialize or otherwise launch an applet associated with a product or service.

Later on in the user lifecycle (e.g., two weeks, two months, one year, etc.), the system 200 can continue to collect contextual information about the user to present more personalized booklets and/or user interfaces (e.g., customized UI 224 and/or customized UI 140). After the user has gone through onboarding (e.g., two weeks later, two months later, one year later, etc.), the existing users and interaction data can be used to gather more contextual information 232 to use to better predict propensity and/or value metrics for the users (e.g., for products or services that they haven't used or could use more, better, or the like). For example, the user may interact with the asset management resource 230 to produce product adoption events 234 to adopt a product or service associated with the UI 224 (e.g., the top ranked product 220). Information about the product adoption events 234 can be transmitted via a push 236 to a user data platform (UDP) service 238 that manages UI generation and display.

In some examples, the UDP service 238 can synchronize 240 with user database 242, which stores historical as well as contextual information about the user. The user database 242 can store product adoption events and other contextual information from an aggregate of users, which propensity and/or value models 246 can use as signals (e.g., onboarding, product usage, location) to determine product ranking 248 for groups of users to determine top ranked products 250, similarly to the product ranker service 210 determining the top ranked product 220. In some examples, propensity ML models, value ML models, and/or recommendation ML models may be trained based on user data (e.g., batched user data) from the user database 242. The users may be batched based on similar demographics, interest topics, responses to certain types of messaging (positive, urgent, etc.), response to UI configuration (e.g., booklet appearance), etc. The propensity and/or value models 246 may update product ranking 248 and/or UI configuration component 252 (which may be updated at a future new customer onboarding flow at, for instance, the product ranker service 210 and UI configuration component 222). Once product ranking 248 selects a top ranked product 250, and the UI configuration component 252 generates, selects, and/or customizes the UI 254, the UDP service 238 can initiate and provide the UI 254 to user devices, and initiate a flow associated with the UI 254. For example, if the UI 254 is related to Bitcoin currency, the campaign service 258 can trigger 260, either within the booklet or after the booklet has been viewed, an upsell email 262, upsell notification 264, in-application ad 266, or an incentive 268 (e.g., stock, cryptocurrency, cash back, promotions, discounts, coupons, loyalty, special access, other incentives described herein, and the like). That is, as a user uses the service over time, additional or alternative contextual information can be monitored, stored, analyzed, and/or otherwise collected and used for generating and/or updating user interfaces. In some examples, such additional or alternative contextual information can be used for updating booklets and/or content associated therewith. As such, as the user uses the service over time, user interfaces can become more relevant and personalized to the user to drive engagement with individual products and/or services and enable streamlined interactions with user interfaces associated therewith.

Figure 3:
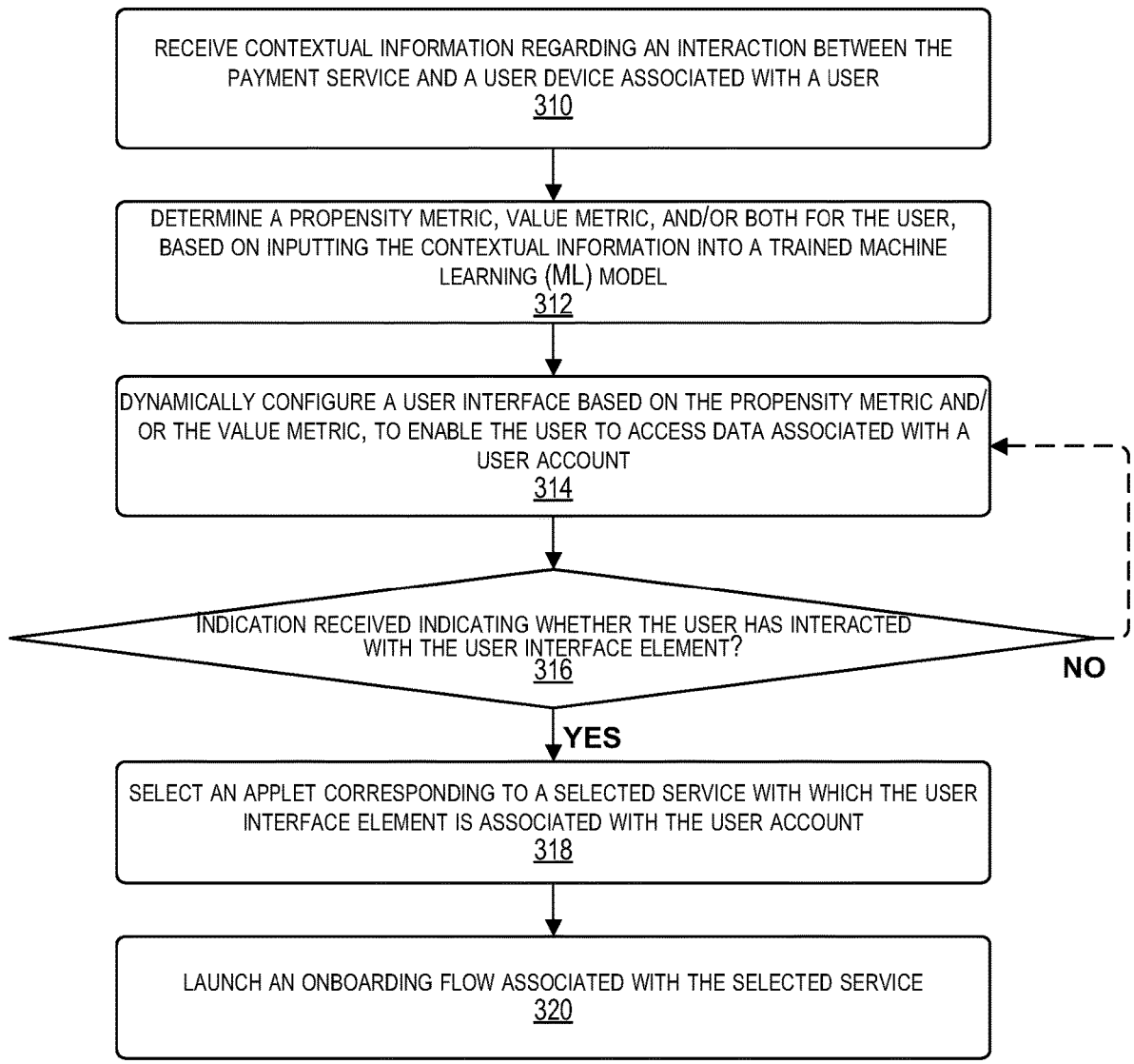
FIG. 3 is a flow diagram illustrating a personalized onboarding process within an asset management service system, in accordance with some examples.

FIG. 3 is a flow diagram illustrating a personalized onboarding process 300 within an asset management service system, in accordance with some examples. The personalized onboarding process 300 can be performed using the personalization system 180, which can be part of or otherwise associated with the asset management service 125 and/or other systems described herein. The order of operations shown below is not limiting and can be performed in any order or combination. Some operations described below are optional.

At operation 310, the personalization system 180 is configured to, and can, receive contextual information regarding an interaction between the payment service and a user device associated with a user. The contextual information is described above, and as referenced above, can include at least one of an internet protocol (IP)-based transaction signal, an IP-based instrument link signal, or an IP-based fraud event signal. In some embodiments, the contextual information can include indications of user interest in one or more specific subjects, such as purchase history (e.g., associations of user email addresses to sellers), social network post content from the user, friends, family, or coworkers of the user, degrees of separation between the user and another user interested in an offered service, amount of disposable income of the user, credit scores, etc.

At operation 312, the personalization system 180 is configured to, and can, determine a propensity metric, value metric, and/or both for the user, based on inputting the contextual information into a trained machine learning (ML) model. The propensity metric can correspond to a likelihood that the user will use the service offered by the payment service. The value metric can correspond to a value of the service offered by the payment service, as well as the risk associated with offering the service (e.g., onboarding costs, risk of fraud, default on payments, etc.). The trained ML model can be trained based on historical user onboarding information, such as information aggregated from similar users (e.g., similar interests, characteristics, demographics, etc.). The trained ML model can also be trained based on onboarding signals, profit after a period of time following onboarding (e.g., the first 90 days after onboarding), product adoption probabilities in first 90 days after onboarding, social networking signals, etc. In some embodiments, the contextual information that generates the propensity metric can decay in strength after a period of time, such that the trained ML model dynamically evolves over time as the user changes over time. The models themselves can be used to identify which products or services should be introduced to the user, and/or which customizations should be applied to booklets and/or user interfaces for the user, allowing for multiple levels of customization and corresponding reinforcement model training and/or reinforcement. In some examples, the techniques described herein use propensity models and/or value models designed for predicting each user's product adoption propensity and future profit during or after customer onboarding stage to pick the top products and/or services to educate the user about, for instance by ranking propensity and/or value metrics for each user and product pair and selecting the pair with the highest value. In some examples, the personalization system 180 can store rules identifying user eligibility for a product or service, and can remove the product or service from being selectable to be recommend or offered to the user when a user is not eligible.

At operation 314, the personalization system 180 is configured to, and can, dynamically configure a user interface based on the propensity metric and/or the value metric, to enable the user to access data associated with a user account. The configuration can include dynamically arranging one or more user interface elements on the user interface in a layout personalized for the user, where each user interface element represents content particular to a service. The user interface can be a user interface of a customized UI 140, a booklet, an applet, or a combination thereof. The layout can be personalized based on placement and type of user interface element, such as booklets or applets with positive messages, urgency-based messages, "premium" messaging, specific dominant colors, image types, text length, image content (e.g., preference for seeing portraits of people vs no people), inclusion of a video, type of booklet (upselling, purely educational, etc.), incentive offered by the booklet (e.g., free cash or stocks), etc. Additionally and/or alternatively, the booklets included within the layout can be selected based upon indications of user interest in one or more specific subjects, such as purchase history (e.g., associations of user email ad-dresses to sellers), social network post content from the user or friends of the user, degrees of separation between the user and another user interested in an offered service, amount of disposable income of the user, etc. In some embodiments, the booklets and/or its characteristics can be ranked, selected, and arranged upon a user interface based on one or more ML recommendation models separate from the propensity ML models.

At decision 316, the personalization system 180 is configured to, and can, receive an indication of whether the user interacted with the user interface element. If not, the user interface element is removed after a period of time, or a new user interface element is displayed at the user interface. If the user interacts with the user interface element, at operation 318, the personalization system 180 is configured to, and can, select an applet corresponding to a selected service with which the user interface element is associated with the user account. At operation 320, the personalization system 180 is configured to, and can, launch an onboarding flow associated with the selected service. The onboarding flow for the new service can be customized for the user and the selected service. The new service can be, for example, investing, bitcoin, etc. with its own onboarding flows. For example, the user interface elements can be dynamically configured in a second layout personalized for the user based on receiving the input from the user, where the second layout creates a personalized flow that represents content particular to the new service offered by the payment service (e.g., a personalized flow for onboarding an investing service, bitcoin service, etc.).

In some examples, the user interface elements can be dynamically arranged as one or more tiles on the user interface that, upon receiving an input from the user, launches a booklet representing content particular to the service offered by the payment service. One or more attributes of the user interface element can be dynamically personalized based on the propensity and/or recommendation ML models, which arranges the user interface elements in accordance with one or more of text-based attributes, image-based attributes, video-based attributes, or booklet content identified by the propensity and/or recommendation ML models.

In some examples, the personalization system 180 receives an input via the user interface. The input is indicative of at least one account interaction for managing at least one asset (e.g., the input can be indicative of interaction(s) 150). The personalization system 180 can facilitate the at least one account interaction to for manage the at least one asset (e.g., by interacting with the transaction processing service 175 via the interaction(s) 150).

Figure 4:
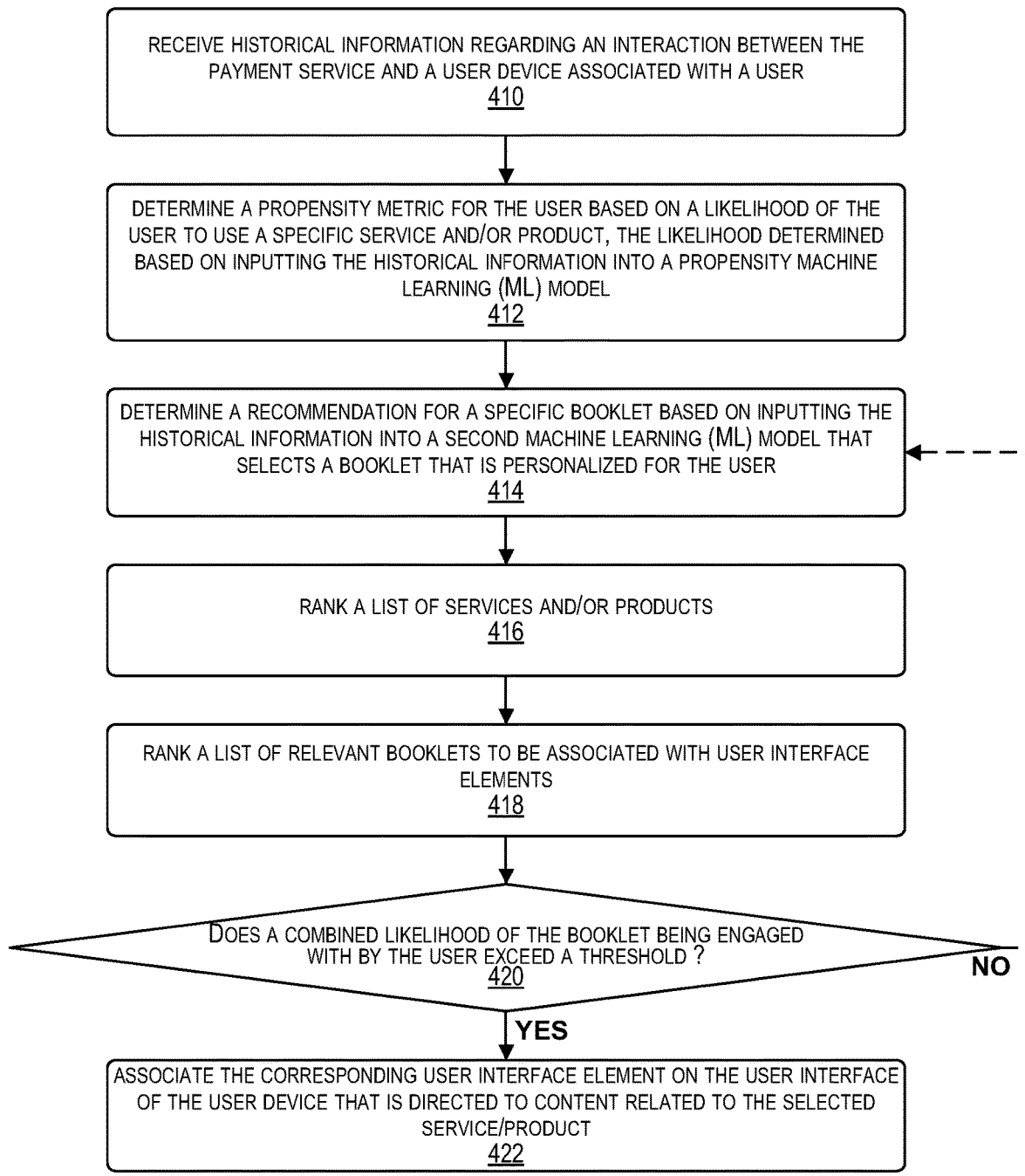
FIG. 4 is a flow diagram illustrating a booklet personalization process within an asset management service system, in accordance with some examples.

FIG. 4 is a flow diagram illustrating a booklet personalization process 400 within an asset management service system, in accordance with some examples. The booklet personalization process 400 can be performed using a personalization system 180, which can be part of or otherwise associated with the asset management service 125 and/or other systems described herein. The order of operations shown below is not limiting and can be performed in any order or combination. Some operations described below are optional.

At operation 410, the personalization system 180 is configured to, and can, receive historical information regarding an interaction between the payment service and a user device associated with a user. At operation 412, the personalization system 180 is configured to, and can, determine a propensity metric for the user based on a likelihood of the user to use a specific service and/or product, the likelihood determined based on inputting the historical information into a propensity machine learning (ML) model.

At operation 414, the personalization system 180 is configured to, and can, determine a recommendation for a specific booklet based on inputting the historical information into a second machine learning (ML) model that selects a booklet that is personalized for the user. The selected booklet can be selected from a set of booklets to be most relevant to the user of the set, and/or with the highest corresponding propensity and/or value metrics, based on contextual information about the user, as discussed with respect to the UI configuration component 222 and/or the UI configuration component 252. The selected booklet can be personalized for the user based on the historical information, the interaction, the propensity metric, a value metric from a value model, or a combination thereof. The selected booklet offered by the payment can be selected and/or ranked for the user from a list of potential booklets based on respective booklet engagement information associated with the list of booklets. For example, the user may have engaged with similar booklets in the past, or users with similar characteristics (e.g., interests, demographics, type of employment, etc.) may have engaged with the same or similar booklets. Appearance of the booklets may also be characteristics and attributes that are associated as being a user preference. The second ML model may, in some embodiments, be trained using the above historical information when analyzing booklet characteristics and its associated user engagement.

Based on these determined user preferences, a recommendation metric for specific booklets can be generated in the second ML model based on user preference that predicts a likelihood of the user engaging with a specific user interface element once they see it. For example, the booklets can be arranged as one or more user interface elements on the user interface in a layout personalized for the user, where each booklet represents content particular to a service. The layout can be personalized based on placement and type of booklet, such as booklets or applets with positive messages, urgency-based messages, "premium" messaging, specific dominant colors, image types, text length, image content (e.g., preference for seeing portraits of people vs no people), inclusion of a video, type of booklet (upselling, purely educational, etc.), incentive offered by the booklet (e.g., free cash or stocks), etc. Additionally and/or alternatively, the booklets included within the layout can be selected based upon indications of user interest in one or more specific subjects, such as purchase history (e.g., associations of user email ad-dresses to sellers), social network post content from the user or friends of the user, degrees of separation between the user and another user interested in an offered service, amount of disposable income of the user, etc.

At operation 416, the personalization system 180 is configured to, and can, rank a list of services and/or products. Similarly, at operation 418, the personalization system 180 is configured to, and can, rank a list of relevant booklets to be associated with user interface elements. Based on pairing the value of the ranked service and/or products and the list of recommended booklets, a recommendation for a selected booklet for a selected product can be selected for the user. The selected product can be selected from a set of product to be most relevant to the user of the set, and/or with the highest corresponding propensity and/or value metrics, based on contextual information about the user, as discussed with respect to the product ranker 210 and/or the product ranker 248. The selected product can be personalized for the user based on the historical information, the interaction, the propensity metric, a value metric from a value model, or a combination thereof.

At decision 420, if the combined likelihood of the booklet being engaged with by the user is over a threshold (e.g., combination of the propensity metric, value metric, and/or recommendation is over a threshold value), then the personalization system 180 is configured to, and can, select an appropriate user interface element to be displayed on the user interface of the user device. For example, the optimal, top booklet is selected and, at operation 422, the personalization system 180 is configured to, and can, associate the corresponding user interface element on the user interface of the user device that is directed to content related to the selected service/product. In other words, the optimal booklet with content based on the selected service/product (e.g., a top ranked booklet related to Bitcoin investing risks and benefits) is placed within the user interface in a layout personalized for the user.

In some examples, customization of interfaces (e.g., booklets and/or other UI elements) as discussed with respect to FIG. 3 and/or FIG. 4 is configured to reduce how many steps, pages, operations, or interfaces are to be presented to a user via a user interface for the user device to perform a particular function, such as initiating an asset transfer, transaction, or other asset management operation. For instance, if the techniques and systems described herein determine that a user is already experienced with a particular product or service, such as one related to management of cryptocurrencies, the techniques and systems can customize the user's interface to skip certain interface elements and jump straight to operations or functions that the user has performed before or is otherwise likely to want to perform based on contextual information. Such improvements to user interface efficiency can also reduce bandwidth usage and conserve data storage, processing power, and other computational resources, for instance by not using computational resources on the skipped interface elements.

Figure 5:
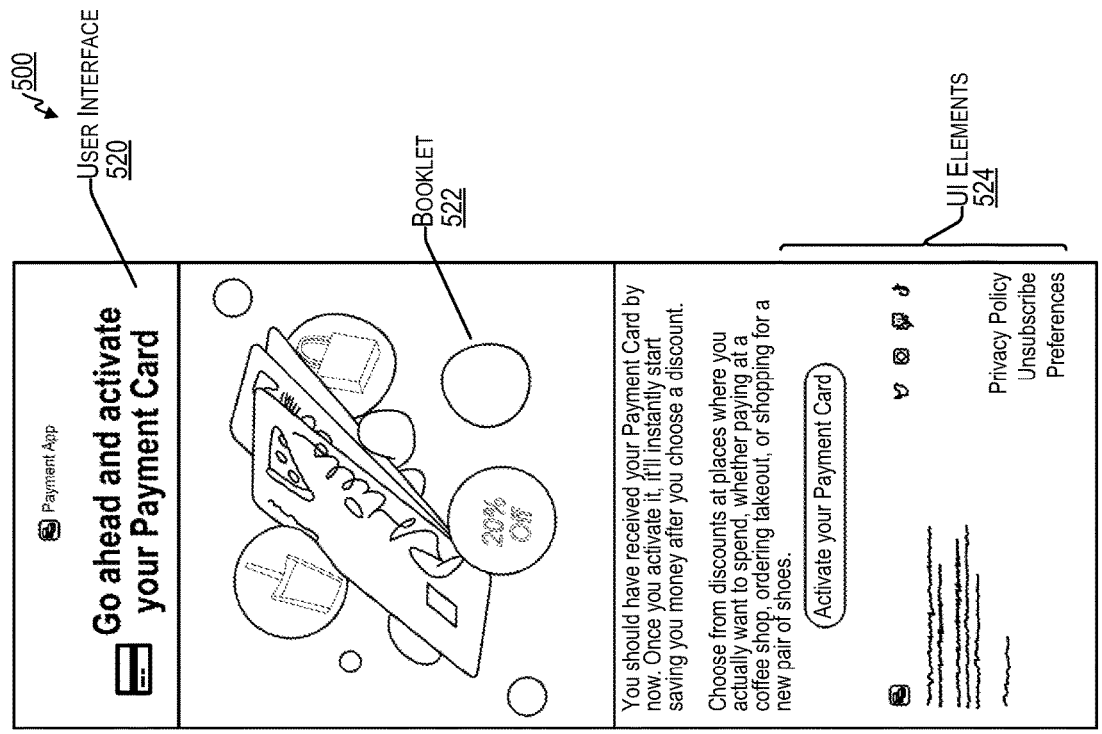
FIG. 5 is a conceptual diagram illustrating user interfaces of an asset management resource used by a user device of a user, including a user interface element for launching an onboarding flow an asset management service system, in accordance with some examples.
Figure 5:
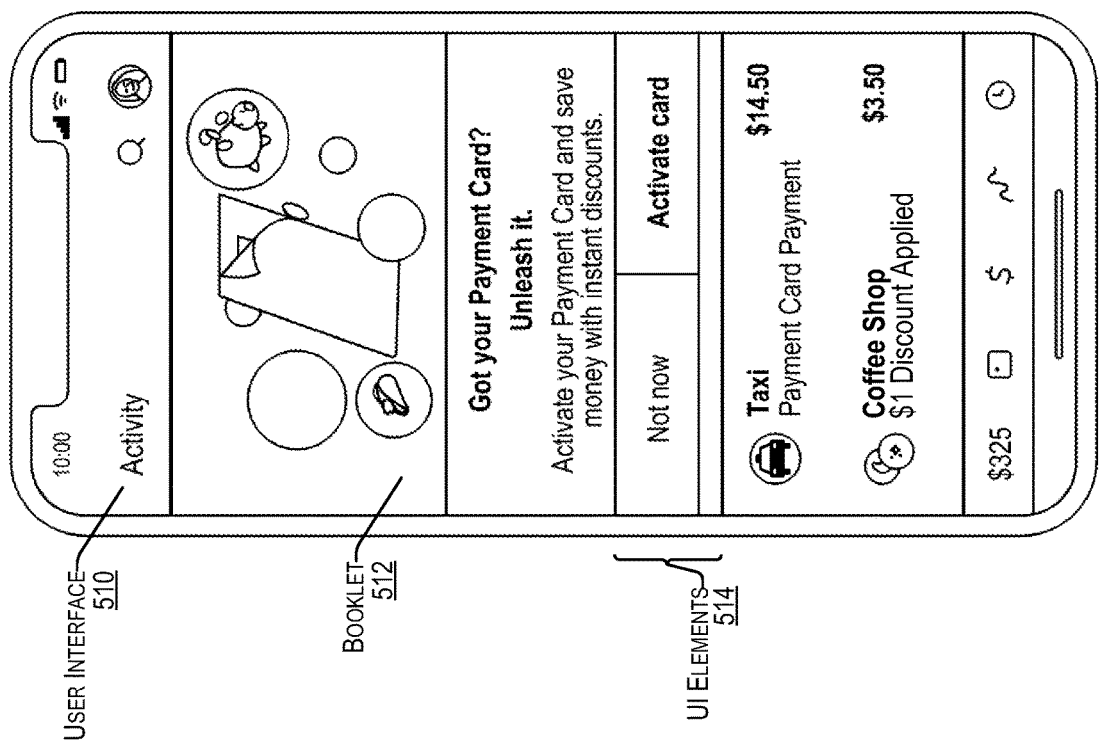

FIG. 5 is a conceptual diagram 500 illustrating user interfaces of an asset management resource used by a user device of a user, including a user interface element for launching an onboarding flow an asset management service system, in accordance with some examples. In user interface 510, which may be presented via the user device 115 to the user 110 via a resource (e.g., an application and/or website), the selected user interface element (e.g., booklet 512) is displayed along with UI elements 514 for card activation within the view along with recent user payments. The user interface 510 is an example of the customized UI 140. For example, based on the user payments below and other contextual information, the propensity ML models, product ranker (e.g., product value), and the recommendation ML models selected a booklet 512 directed to activating a digital payment card (e.g., an example of the product or service 145). The topic of the payment card, the appearance of the booklet (e.g., colors, image or video type, messaging flavor such as positive or urgency-based messaging), and/or the placement of the booklet 512 within the user interface 510 view are personalized to the user, whether during onboarding (e.g., the cold start model utilizing IP-based context signals) or later on in the user's lifecycle (e.g., the warm start model utilizing historical user information). For instance, the message in the booklet 512 is customized to discuss how activating the payment card can save money with instant discounts, a positive message that may be selected by the asset management service 125 based on contextual information 120 about the user indicating that the user is interested in saving money (e.g., the user is low on funds, the user's transaction history indicates that the user is saving for a particular purchase such as a home or vehicle, the user's transaction history indicates frequent usage of discounts and/or promotions and/or coupons and/or incentives, and the like). The image in the booklet 512 illustrate a piggy bank and a taco beside an image of the wrapped-up payment card. The piggy bank may be selected by the asset management service 125 based on contextual information 120 (e.g., based on the user's interest in saving money as discussed above). The taco may also be selected by the asset management service 125 based on contextual information 120 (e.g., based on the user's transaction history indicating a preference for tacos). The UI elements 514 may be customized and/or chosen to go along with the text and imagery of the booklet, allowing the user to activate the payment card via a button press (e.g., an example of the interaction(s) 150) to launch an onboarding flow for the payment card from the UI elements 514.

The user interface 520, which may also be presented via the user device 115 to the user 110 via a resource (e.g., an application and/or website), shows another example of a personalized user interface element—this time booklet 522 which spans the entire view instead of a portion of the view, and presents more incentives as well as a minimalist approach to booklet appearance. The booklet 512 and the booklet 522 are examples of at least a portion of the customized UI 140, and can be customized to the user. In some examples, the user interface 510 and the user interface 520 are also examples of at least a portion of the customized UI 140. For instance, the contextual information 120 may indicate an indication that the payment card was already delivered or otherwise received by the user, and thus the message in the booklet 522 indicates that "You should have received your Payment Card by now" and encourages the user to activate the Payment Card (e.g., the product or service 145) so it can "instantly start saving you money after you choose a discount," explaining that the user can "[c]hoose from discounts at places where you actually want to spend, whether paying at a coffee shop, ordering takeout, or shopping for a new pair of shoes." The discounts described herein may be part of the product or service 145, and the explanation of how they work may be included as part of the booklet 522 based on contextual information indicting that the user has not used such discounts previously. The user interface 520 includes UI elements 524 that likewise allow the user to activate their Payment Card via a button press (e.g., an example of interaction(s) 150). The image illustrates an example of the payment card with a "20% off" icon representing the savings from the discounts, a drink selected based on contextual information 120 indicating that the user enjoys coffee (e.g., such as the portion of transaction history illustrated in the user interface 510), and a shopping bag selected based on contextual information 120 indicating that the user enjoys shopping.

Figure 6A:
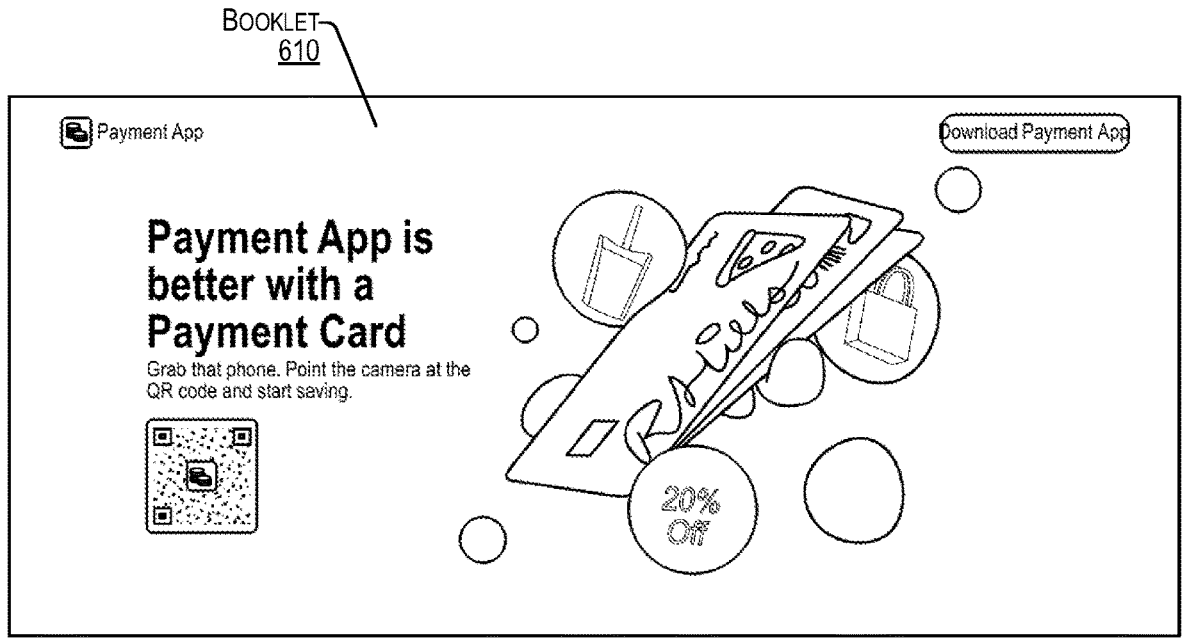
FIG. 6A is a conceptual diagram illustrating an example user interface element of an asset management resource used by a user device of a user, in accordance with some examples.
Figure 6B:
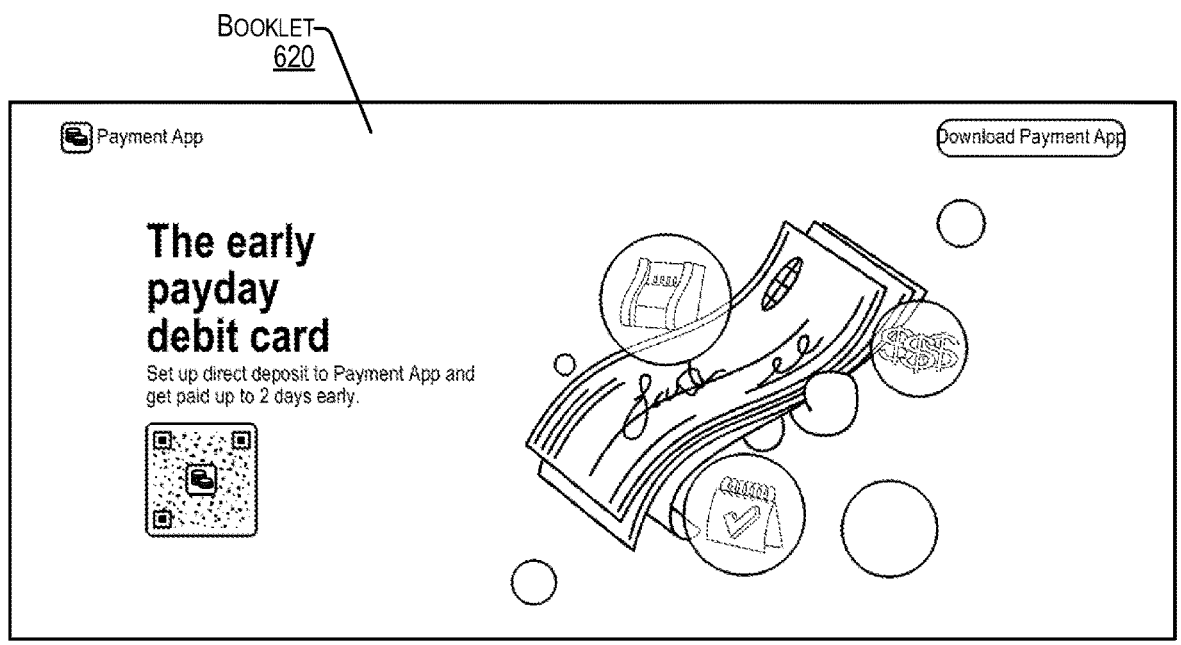
FIG. 6B is a conceptual diagram illustrating an example user interface element of an asset management resource used by a user device of a user, in accordance with some examples.

FIGS. 6A and 6B show conceptual diagrams illustrating example user interface elements in accordance with some examples. FIG. 6A illustrates an example booklet 610 presented to a specific user, where the propensity ML models, product ranker (e.g., product value), and the recommendation ML models selected booklet 610 directed to opening a digital card using positive messaging, a specific color scheme, and an image that is likely to appeal to the user. For instance, the message and image in the booklet 610 are customized to be focused on savings from discounts or other incentives, for instance based on contextual information 120 indicating that the user prefers discounts and saving money, with icons suggesting discounts on various items that the user likes illustrated.

FIG. 6B shows an example booklet 620 presented to another user, where the propensity ML models, product ranker, and the recommendation ML models selected booklet 620 directed to opening a digital card using incentive messaging, a lighter color scheme, and a different image that is likely to appeal to the separate user. The booklet 610 and the booklet 620 are examples of at least a portion of the customized UI 140, the UI 224, the UI 254, other UIs illustrated or described herein, or a combination thereof. For instance, the message and image in the booklet 620 are customized to be focused on early payday (e.g., getting paid up to 2 days early via direct deposit), for instance based on contextual information 120 indicating that the user may be in immediate need of funds and/or prefers to receive funds earlier when possible, with icons of calendars and cash registers suggesting quick access to funds. Both the booklet 610 and the booklet 620 include interactive elements, illustrated as quick response (QR) codes, which can be scanned by the user to conduct interaction(s) 150 such as downloading the payment app, requesting the payment card, activating the payment card, and the like.

Figure 7:
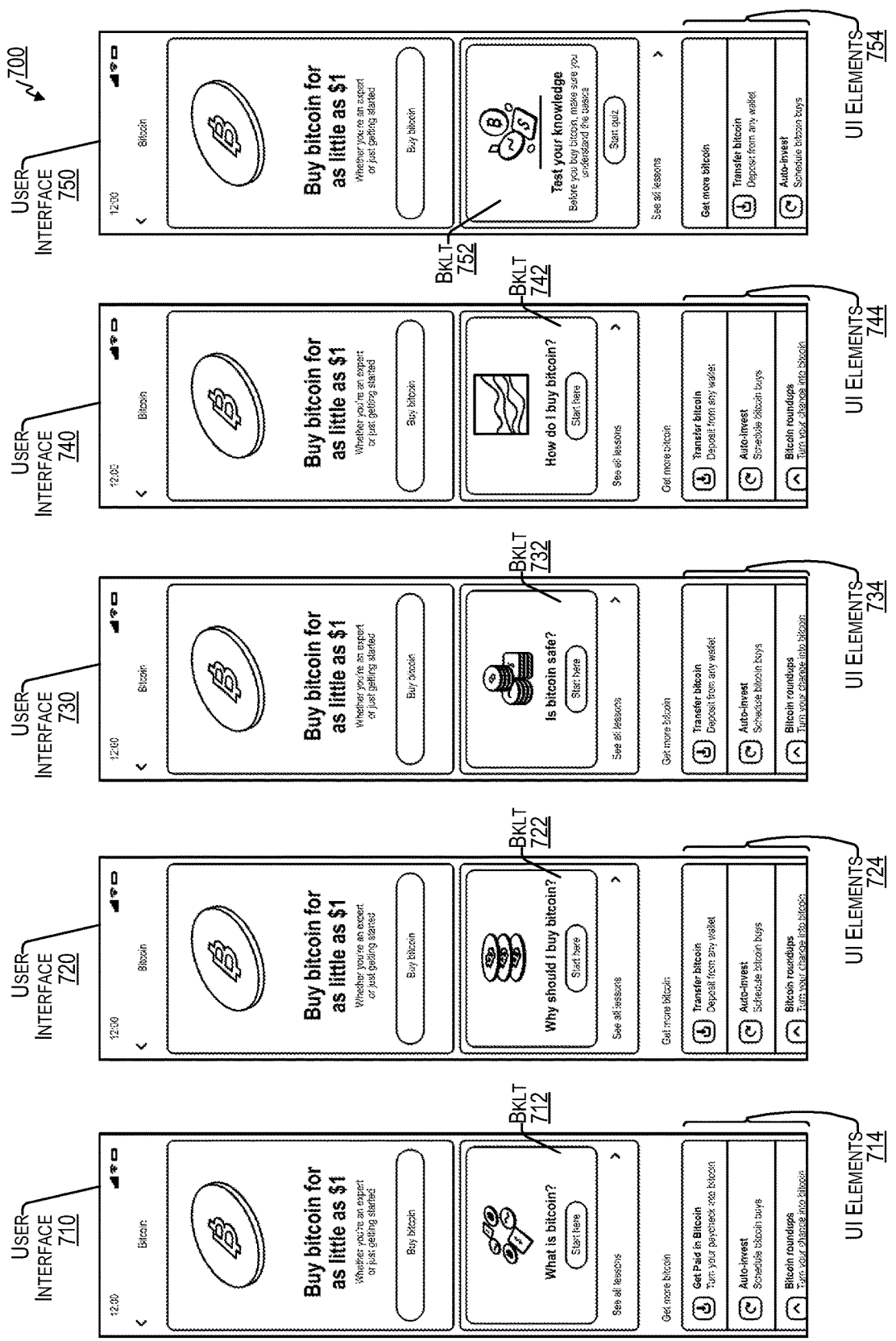
FIG. 7 is a conceptual diagram illustrating example user interface elements of an asset management resource used by a user device of a user, wherein individual of the user interface elements are personalized for the user, in accordance with some examples.

FIG. 7 is a conceptual diagram illustrating example user interface elements of an asset management resource used by a user device of a user, in accordance with some examples. Multiple user interfaces are shown in series that illustrate the large variety of booklet presentation styles personalized to the user. For example, user interface 710 shares a top image among user interface 720, user interface 730, user interface 740, and user interface 750, but booklet 712 is presented within a tile and is displayed in a style different than the other example booklets. Specifically, booklet 712 utilizes a minimalistic style of expressing a potential question the user has about bitcoin; booklet 722 utilizes a positive based messaging; booklet 732 utilizes urgency-based messaging; booklet 742 utilizes informational/incentive style; and booklet 752 utilizes a quiz style of informational marketing. Each of these are customized based on contextual information 120 indicating that such customizations would maximize propensity and/or value metrics for the user. Booklet options 714 on user interface 710, booklet options 724 on user interface 720, booklet options 734 on user interface 730, booklet options 744 on user interface 740, and booklet options 754 on user interface 750 show more booklets that have been ranked lower than the main displayed booklet by the recommendation ML models. For example, a text length attribute for booklet 712, booklet 722, booklet 732, booklet 742, and/or booklet 752 can translate into a feature at the booklet level but also combine with customer information to create features such as: clickthrough rate for a given customer for all booklets with text length 0-80 words, 80-160 words, and 160+ words; clickthrough rate for a given customer for discount-related booklets with text length 0-80 words, 80-160 words, and 160+ words; average text length for all of the booklets that a given customer has interacted with in the past; and average text length for all test of the booklets/UIs that customers from a specific location (e.g., the state of Colorado) have interacted with in the past. By accounting for intersections (e.g., matches, similarities, shared characteristics, shared properties) of UI, booklet, product type, user, and user group information, this approach to modeling allows for generation, selection, recommendation, and/or customization of highly personalized UIs (e.g., booklets and other UI elements) with relevant information to the user. For instance, intersections may indicate that a user likes a particular color (e.g., red, blue, green) and prefers a particular writing style (e.g., positive, concise, verbose, educational, timeline-focused), and that the UI (e.g., the booklet and other UI elements) uses that particular color and that particular writing style. The booklets 712, 722, 732, 742, and 752 are examples of at least a portion of the customized UI 140. In some examples, the booklet options 714, 724, 734, 744, and 754 are also examples of at least a portion of the customized UI 140, the UI 224, the UI 254, other UIs illustrated or described herein, or a combination thereof.

Figure 8:
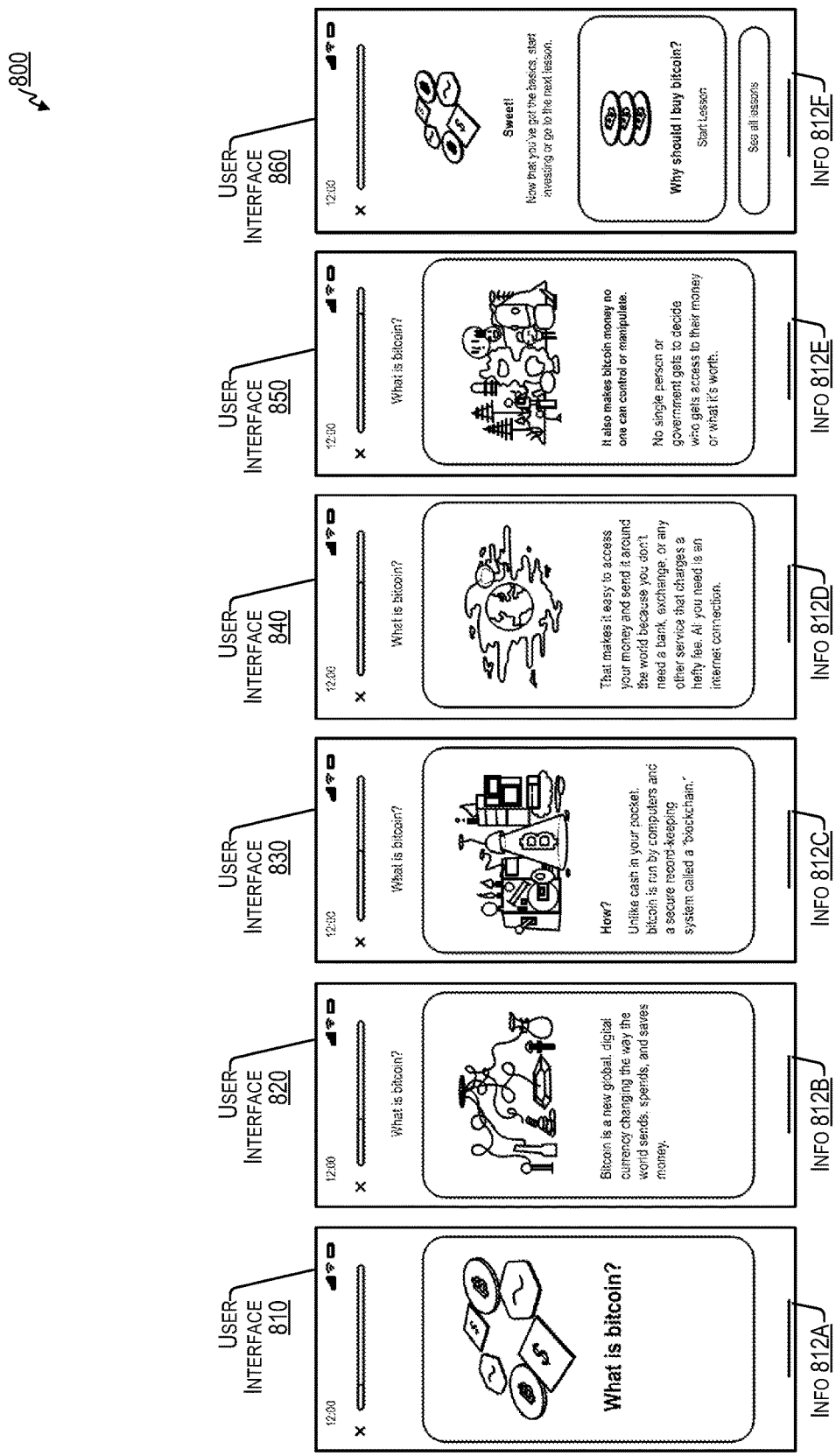
FIG. 8 is a conceptual diagram illustrated an example booklet displayed within a user interface used by a user device of a user, in accordance with some examples.

FIG. 8 is a conceptual diagram illustrated an example booklet displayed within a user interface used by a user device of a user, in accordance with some examples. User interface 810 shows a first page of the booklet, presenting information 812A. Proceeding through the booklet shows user interface 820, with additional information 812B. Similarly, user interface 830 shows additional information 812C; user interface 840 shows additional information 812D; user interface 850 shows additional information 812E; and user interface 860 shows additional information 812F. The information 812A-812F are examples of at least a portion of the customized UI 140, the UI 224, the UI 254, other UIs illustrated or described herein, or a combination thereof. The user interfaces are customized to provide information about bitcoin, explaining for instance how bitcoin works, based on contextual information 120 indicating that the user may be inexperienced with bitcoin and/or cryptocurrencies in general.

Figure 9:
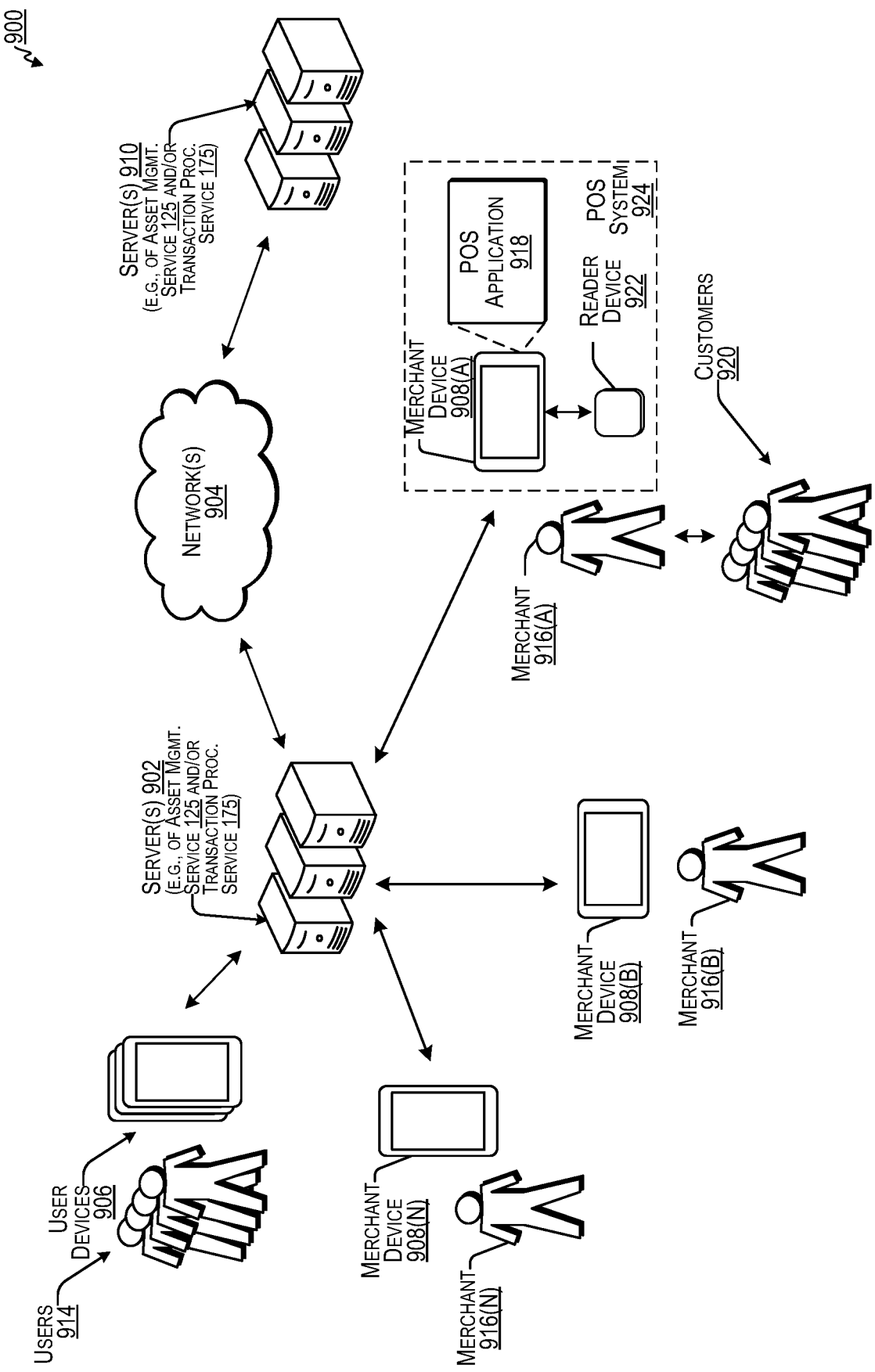
FIG. 9 is a block diagram illustrating an environment that includes various devices associated with one or more merchants, in accordance with some examples.

FIG. 9 is a block diagram illustrating an environment 900 that includes various devices associated with one or more merchants. The environment 900 includes server(s) 902 that can communicate over a network 904 with user devices 906 (which, in some examples can be merchant devices 908 (individually, 908(A)-908(N))) and/or server(s) 910 associated with third-party service provider(s). The server(s) 902 can be associated with a service provider that can provide one or more services for the benefit of users 914, as described below. Actions attributed to the service provider can be performed by the server(s) 902.

The user 110 may be an example of one of the users 914, the customers 920, and/or the merchants 916(A)-916(N)). The user device 115 may be an example of one of the user devices 906, the merchant devices 908(A)-908(N), the reader device 922, and/or the POS system 924. For instance, corresponding information can read by one of the merchant devices 908(A)-908(N), the reader device 922, and/or the POS system 924. The information can include a resource identifier that causes the merchant devices 908(A)-908(N), the reader device 922, and/or the POS system 924 to access a depositing resource of the POS application 918. The asset management resource 118 may be examples of the POS application 918, any software or websites running on the user devices 906, or a combination thereof. The network(s) 105 may be example(s) of the network(s) 904. The server(s) associated with the asset management service 125 may be examples of the server(s) 902, the server(s) 910, or a combination thereof. The server(s) associated with the transaction processing service 175 may be examples of the server(s) 902, the server(s) 910, or a combination thereof. For instance, the server(s) 902 and/or the server(s) 910 can generate the customized UI 140 to be relevant to a user (e.g., one of the users 914, the customers 920, and/or the merchants 916(A)-916(N))), and can provide the customized UI 140 to a user device (e.g., one of the user devices 906, the merchant devices 908(A)-908(N), the reader device 922, and/or the POS system 924).

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 814. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

As described above, in at least one example, the users 914 can include merchants 916 (individually, 916(A)-916(N)). In an example, the merchants 916 can operate respective merchant devices 808, which can be user devices 906 configured for use by merchants 916. For the purpose of this discussion, a "merchant" can be any entity that offers items (e.g., goods or services) for purchase or other means of acquisition (e.g., rent, borrow, barter, etc.). The merchants 916 can offer items for purchase or other means of acquisition via brick-and-mortar stores, mobile stores (e.g., pop-up shops, food trucks, etc.), online stores, combinations of the foregoing, and so forth. In some examples, at least some of the merchants 916 can be associated with a same entity but can have different merchant locations and/or can have franchise/franchisee relationships. In additional or alternative examples, the merchants 916 can be different merchants. That is, in at least one example, the merchant 916(A) is a different merchant than the merchant 916(B) and/or the merchant 916(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 908 can have an instance of a POS application 918 stored thereon. The POS application 918 can configure the merchant device 908 as a POS terminal, which enables the merchant 916(A) to interact with one or more customers 920. As described above, the users 914 can include customers, such as the customers 920 shown as interacting with the merchant 916(A). For the purpose of this discussion, a "customer" can be any entity that acquires items from merchants. While only two customers 920 are illustrated in FIG. 9, any number of customers 920 can interact with the merchants 916. Further, while FIG. 9 illustrates the customers 920 interacting with the merchant 916(A), the customers 920 can interact with any of the merchants 916.

In at least one example, interactions between the customers 920 and the merchants 916 that involve the exchange of funds (from the customers 920) for items (from the merchants 916) can be referred to as "transactions." In at least one example, the POS application 918 can determine transaction data associated with the POS transactions. Transaction data can include payment information, which can be obtained from a reader device 922 associated with the merchant device 908(A), user authentication data, purchase amount information, point-of-purchase information (e.g., item(s) purchased, date of purchase, time of purchase, etc.), etc. The POS application 918 can send transaction data to the server(s) 902 such that the server(s) 902 can track transactions of the customers 920, merchants 916, and/or any of the users 914 over time. Furthermore, the POS application 918 can present a UI to enable the merchant 916(A) to interact with the POS application 918 and/or the service provider via the POS application 918.

In at least one example, the merchant device 908(A) can be a special-purpose computing device configured as a POS terminal (via the execution of the POS application 918). In at least one example, the POS terminal may be connected to a reader device 922, which is capable of accepting a variety of payment instruments, such as credit cards, debit cards, gift cards, short-range communication based payment instruments, and the like, as described below. In at least one example, the reader device 922 can plug in to a port in the merchant device 908(A), such as a microphone port, a headphone port, an audio-jack, a data port, or other suitable port. In additional or alternative examples, the reader device 922 can be coupled to the merchant device 908(A) via another wired or wireless connection, such as via a Bluetooth®, BLE, and so on. Additional details are described below with reference to FIG. 12. In some examples, the reader device 922 can read information from alternative payment instruments including, but not limited to, wristbands and the like.

In some examples, the reader device 922 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 922, and communicate with the server(s) 902, which can provide, among other services, a payment processing service. The server(s) 902 associated with the service provider can communicate with server(s) 910, as described below. In this manner, the POS terminal and reader device 922 may collectively process transaction(s) between the merchants 916 and customers 920. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there can be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 922 of the POS system 924 are shown as separate devices, in additional or alternative examples, the POS terminal and the reader device 922 can be part of a single device. In some examples, the reader device 922 can have a display integrated therein for presenting information to the customers 920. In additional or alternative examples, the POS terminal can have a display integrated therein for presenting information to the customers 920. POS systems, such as the POS system 924, may be mobile, such that POS terminals and reader devices may process transactions in disparate locations across the world. POS systems can be used for processing card-present transactions and card-not-present (CNP) transactions, as described below.

A card-present transaction is a transaction where both a customer 920 and his or her payment instrument are physically present at the time of the transaction. Card-present transactions may be processed by swipes, dips, taps, or any other interaction between a physical payment instrument (e.g., a card), or otherwise present payment instrument, and a reader device 922 whereby the reader device 922 is able to obtain payment data from the payment instrument. A swipe is a card-present transaction where a customer 920 slides a card, or other payment instrument, having a magnetic strip through a reader device 922 that captures payment data contained in the magnetic strip. A dip is a card-present transaction where a customer 920 inserts a payment instrument having an embedded microchip (i.e., chip) into a reader device 922 first. The dipped payment instrument remains in the payment reader until the reader device 922 prompts the customer 920 to remove the card, or other payment instrument. While the payment instrument is in the reader device 922, the microchip can create a one-time code which is sent from the POS system 924 to the server(s) 910 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 920 may tap or hover his or her payment instrument (e.g., card, electronic device such as a smart phone running a payment application, etc.) over a reader device 922 to complete a transaction via short-range communication (e.g., NFC, RFID, Bluetooth®, BLE, etc.). Short-range communication enables the payment instrument to exchange information with the reader device 922. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 924, the server(s) 902, and/or the server(s) 910 may exchange payment information and transaction data to determine whether transactions are authorized. For example, the POS system 924 may provide encrypted payment data, user authentication data, purchase amount information, point-of-purchase information, etc. (collectively, transaction data) to server(s) 902 over the network(s) 904. The server(s) 902 may send the transaction data to the server(s) 910. As described above, in at least one example, the server(s) 910 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 910 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 910 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 910 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 910 associated therewith), and a payment authorization message is communicated from the issuer to the POS device via a path opposite of that described above, or via an alternate path.

As described above, the server(s) 910, which can be associated with payment service provider(s), may determine whether the transaction is authorized based on the transaction data, as well as information relating to parties to the transaction (e.g., the customer 920 and/or the merchant 916(A)). The server(s) 910 may send an authorization notification over the network(s) 904 to the server(s) 902, which may send the authorization notification to the POS system 924 over the network(s) 904 to indicate whether the transaction is authorized. The server(s) 902 may also transmit additional information such as transaction identifiers to the POS system 924. In one example, the server(s) 902 may include a merchant application and/or other functional components for communicating with the POS system 924 and/or the server(s) 910 to authorize or decline transactions.

Based on the authentication notification that is received by the POS system 924 from server(s) 902, the merchant 916(A) may indicate to the customer 920 whether the transaction has been approved. In some examples, approval may be indicated at the POS system 924, for example, at a display of the POS system 924. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 914 can access all of the services of the service provider. In other examples, the users 914 can have gradated access to the services, which can be based on risk tolerance, IDV outputs, subscriptions, and so on. In at least one example, access to such services can be availed to the merchants 916 via the POS application 918. In additional or alternative examples, each service can be associated with its own access point (e.g., application, web browser, etc.).

The service provider can offer payment processing services for processing payments on behalf of the merchants 916, as described above. For example, the service provider can provision payment processing software, payment processing hardware and/or payment processing services to merchants 916, as described above, to enable the merchants 916 to receive payments from the customers 920 when conducting POS transactions with the customers 920. For instance, the service provider can enable the merchants 916 to receive cash payments, payment card payments, and/or electronic payments from customers 920 for POS transactions and the service provider can process transactions on behalf of the merchants 916.

As the service provider processes transactions on behalf of the merchants 916, the service provider can maintain accounts or balances for the merchants 916 in one or more ledgers. For example, the service provider can analyze transaction data received for a transaction to determine an amount of funds owed to a merchant 916(A) for the transaction. In at least one example, such an amount can be a total purchase price less fees charged by the service provider for providing the payment processing services. Based on determining the amount of funds owed to the merchant 916(A), the service provider can deposit funds into an account of the merchant 916(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 916(A) to a bank account of the merchant 916(A) that is held at a bank or other financial institution (e.g., associated with the server(s) 910). Scheduled deposits can occur at a prearranged time after a POS transaction is funded, which can be a business day after the POS transaction occurred, or sooner or later. In some examples, the merchant 916(A) can access funds prior to a scheduled deposit. For instance, the merchant 916(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 916(A) can have a payment instrument that is linked to the stored balance that enables the merchant to access the funds without first transferring the funds from the account managed by the service provider to the bank account of the merchant 916(A).

In at least one example, the service provider may provide inventory management services. That is, the service provider may provide inventory tracking and reporting. Inventory management services may enable the merchant 916(A) to access and manage a database storing data associated with a quantity of each item that the merchant 916(A) has available (i.e., an inventory). Furthermore, in at least one example, the service provider can provide catalog management services to enable the merchant 916(A) to maintain a catalog, which can be a database storing data associated with items that the merchant 916(A) has available for acquisition (i.e., catalog management services). In at least one example, the catalog may include a plurality of data items and a data item of the plurality of data items may represent an item that the merchant 921(A) has available for acquisition. The service provider can offer recommendations related to pricing of the items, placement of items on the catalog, and multi-party fulfilment of the inventory.

In at least one example, the service provider can provide business banking services, which allow the merchant 916(A) to track deposits (from payment processing and/or other sources of funds) into an account of the merchant 916(A), payroll payments from the account (e.g., payments to employees of the merchant 916(A)), payments to other merchants (e.g., business-to-business) directly from the account or from a linked debit card, withdrawals made via scheduled deposit and/or instant deposit, etc. Furthermore, the business banking services can enable the merchant 916(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 916 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 916. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 912 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 914 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 916. In at least one example, the service provider can recommend and/or generate content items to supplement omni-channel presences of the merchants 916. That is, if a merchant of the merchants 916 has a web page, the service provider-via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 914 to set schedules for scheduling appointments and/or users 914 to schedule appointments.

In some examples, the service provider can provide restaurant management services to enable users 914 to make and/or manage reservations, to monitor front-of-house and/or back-of-house operations, and so on. In such examples, the merchant device(s) 908 and/or server(s) 902 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 914 who can travel between locations to perform services for a requesting user 914 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 906.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 914, voice inputs into a virtual assistant or the like, to determine intents of user(s) 914. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 914 may be new to the service provider such that the user 914 that has not registered (e.g., subscribed to receive access to one or more services offered by the service provider) with the service provider. The service provider can offer onboarding services for registering a potential user 914 with the service provider. In some examples, onboarding can involve presenting various questions, prompts, and the like to a potential user 914 to obtain information that can be used to generate a profile for the potential user 914. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 914 providing all necessary information, the potential user 914 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 910). That is, the service provider can offer IDV services to verify the identity of users 914 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 914 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 910 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 902) and/or the server(s) 910 via the network(s) 904. In some examples, the merchant device(s) 908 are not capable of connecting with the service provider (e.g., the server(s) 902) and/or the server(s) 910, due to a network connectivity issue, for example. In additional or alternative examples, the server(s) 902 are not capable of communicating with the server(s) 910 due to network connectivity issue, for example. In such examples, devices may operate in "offline" mode where at least some payment data is stored (e.g., on the merchant device(s) 908) and/or the server(s) 902 until connectivity is restored and the payment data can be transmitted to the server(s) 902 and/or the server(s) 910 for processing.

In at least one example, the service provider can be associated with a hub, such as an order hub, an inventory hub, a fulfillment hub and so on, which can enable integration with one or more additional service providers (e.g., associated with the additional server(s) 910). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 906 that are in communication with one or more server computing devices 902 of the service provider. That is, techniques described herein are directed to a specific implementation—or, a practical application—of utilizing a distributed system of user devices 906 that are in communication with one or more server computing devices 902 of the service provider to perform a variety of services, as described above. The unconventional configuration of the distributed system described herein enables the server(s) 902 that are remotely-located from end-users (e.g., users 914) to intelligently offer services based on aggregated data associated with the end-users, such as the users 914 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 914 and user devices 906. Furthermore, such features are changed dynamically based on the profiles of the users involved interacting with the GUIs. As such, techniques described herein are directed to improvements to computing systems.

Figure 10:
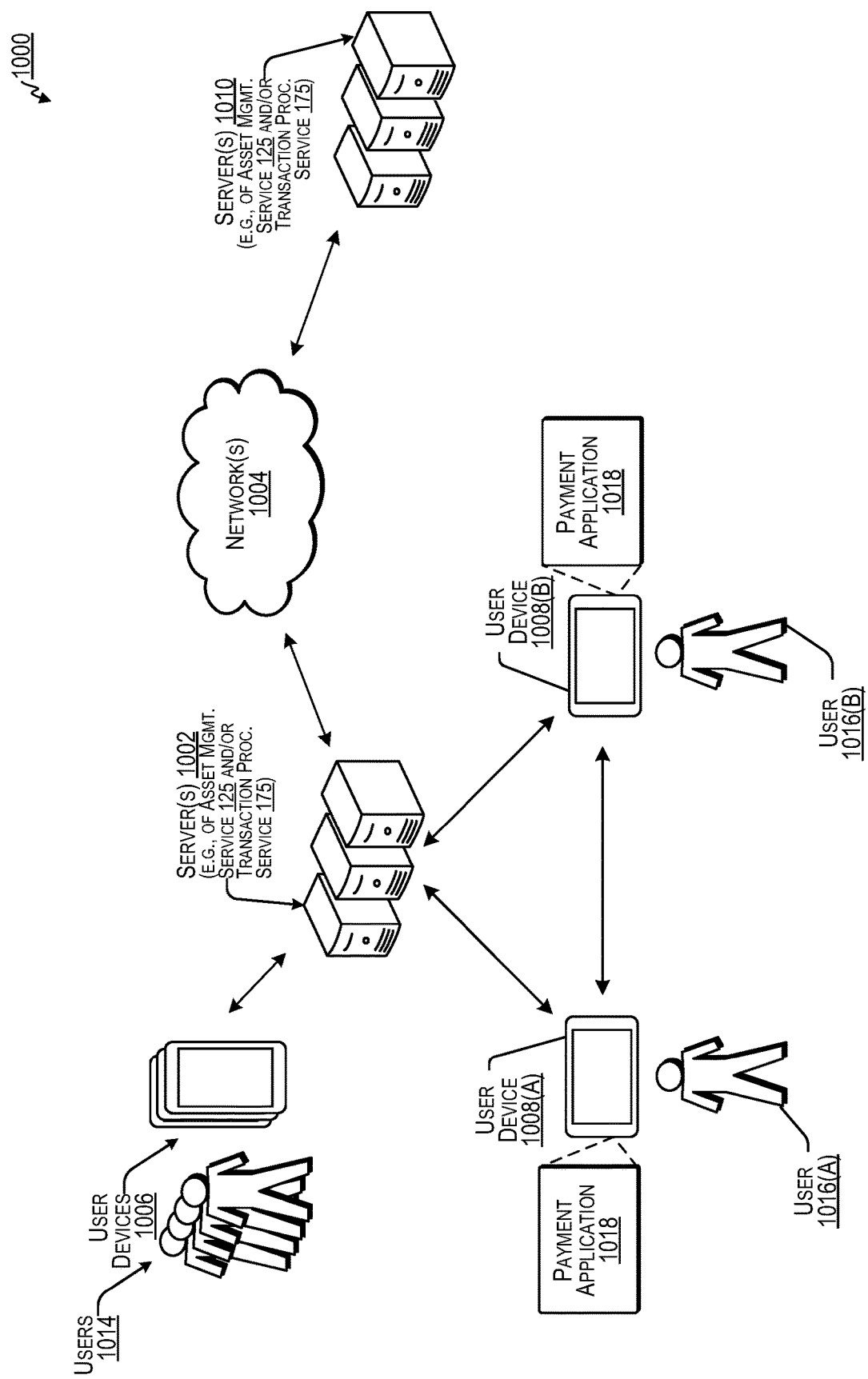
FIG. 10 is a block diagram illustrating an environment that includes various device associated with one or more payment services, in accordance with some examples.

FIG. 10 is a block diagram illustrating an environment 1000 that includes various devices associated with one or more payment services. The environment 1000 includes server(s) 1002 that can communicate over a network 1004 with user devices 1006 (which, in some examples can be user devices 1008 (individually, 1008(A), 1008(B)) and/or server(s) 1010 associated with third-party service provider(s). The server(s) 1002 can be associated with a service provider that can provide one or more services for the benefit of users 1014, as described below. Actions attributed to the service provider can be performed by the server(s) 1002. In some examples, the service provider referenced in FIG. 9 can be the same or different than the service provider referenced in FIG. 10.

The user 110 may be an example of one of the users 1014 and/or the users 1016(A)-1016(B). The user device 115 may be an example of one of the user devices 1006 and/or one of the one of the user devices 1008(A)-1008(B). The asset management resource 118, may be an example of the payment application 1018. For instance, the payor instance of the asset management resource 118 may be an example of the instance of the payment application 1018 running on the user device 1008(A), while the payee instance of the asset management resource 118 may be an example of the instance of the payment application 1018 running on the user device 1008(B). For instance, the customized UI 140 can be interacted with, and the corresponding information read by, the user device 1008(A) or the user device 1008(B), and can include a resource identifier that causes the user device 1008(A) or the user device 1008(B) to access a depositing resource of the payment application 1018. The network(s) 105 may be example(s) of the network(s) 1004. The server(s) associated with the transfer instrument generation service 125 may be examples of the server(s) 1002, the server(s) 1010, or a combination thereof. The server(s) associated with the transaction processing service 175 may be examples of the server(s) 1002, the server(s) 1010, or a combination thereof. For instance, the server(s) 1002 and/or the server(s) 1010 can generate the customized UI 140 to be relevant to a user (e.g., one of users 1014 and/or the users 1016(A)-1016(B)), and can provide the customized UI 140 to a user device (e.g., one of the user devices 1006 and/or one of the one of the user devices 1008(A)-1008(B)).

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

In at least one example, the service provider can provide a peer-to-peer payment service that enables peer-to-peer payments between two or more users 1014. Two users, user 1016(A) and user 1016(B) are illustrated in FIG. 10 as "peers" in a peer-to-peer payment. In at least one example, the service provider can communicate with instances of a payment application 1018 (or other access point) installed on devices 1006 configured for operation by users 1014. In an example, an instance of the payment application 1018 executing on a first device 1008(A) operated by a payor (e.g., user 1016(A)) can send a request to the service provider to transfer an asset (e.g., fiat currency, non-fiat currency, cryptocurrency, securities, gift cards, and/or related assets) from the payor to a payee (e.g., user 1016(B)) via a peer-to-peer payment. In some examples, assets associated with an account of the payor are transferred to an account of the payee. In some examples, assets can be held at least temporarily in an account of the service provider prior to transferring the assets to the account of the payee.

In some examples, the service provider can utilize a ledger system to track transfers of assets between users 1006.

Figure 11:
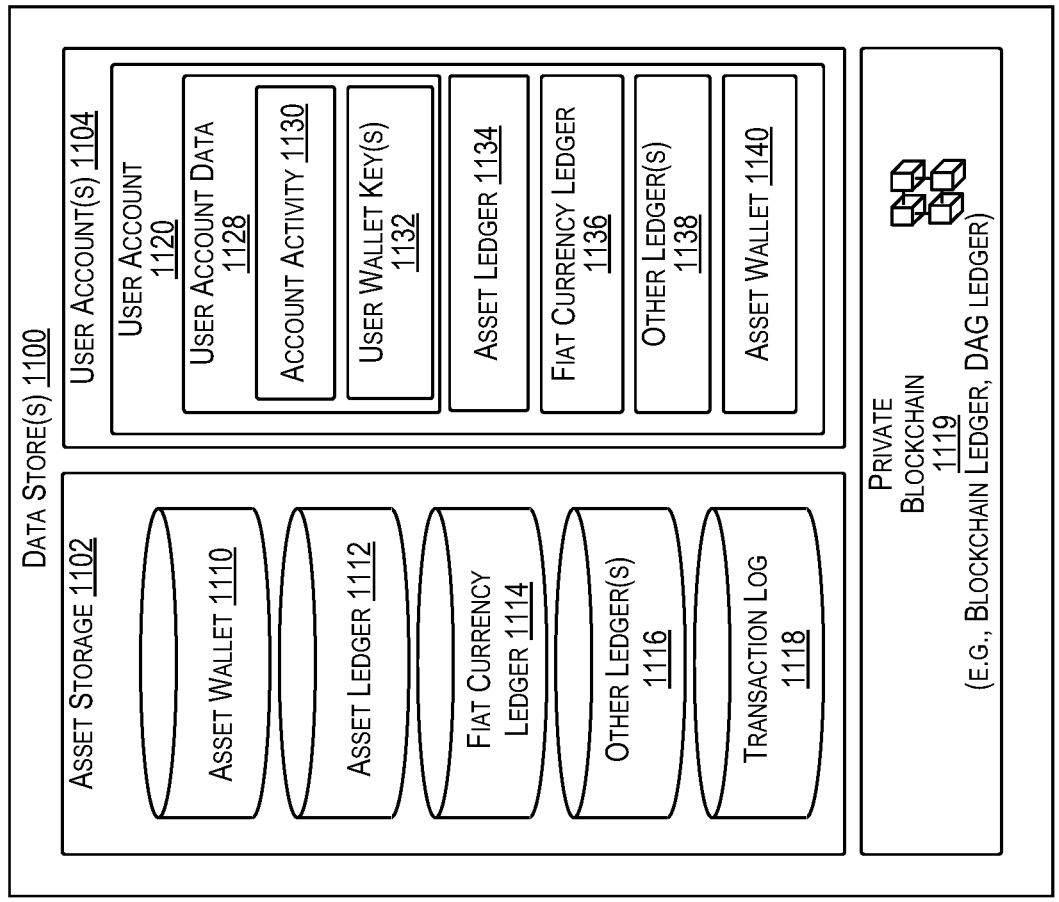
FIG. 11 is a block diagram illustrating a ledger system, in accordance with some examples.
Figure 11:
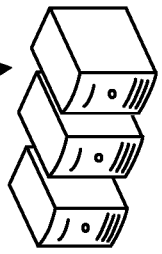

FIG. 11 is a block diagram illustrating a ledger system. The ledger system of FIG. 11 may provide additional details associated with a ledger system that may be used with the systems of FIG. 9 and/or FIG. 10. The ledger system can enable users 1006 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1018 executing on user device(s) of payee(s). As an example, the service provider can transfer assets from an account of user 1016(A) to an account of the user 1016(B) and can send a notification to the user device 1008(B) of the user 1016(B) for presentation via a user interface. The notification can indicate that a transfer is in process, a transfer is complete, or the like. In some examples, the service provider can send additional or alternative information to the instances of the payment application 1018 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash).

The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1018 executing on the user devices 1006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 10 or a third-party service provider associated with the server(s) 1010. In examples where the content provider is a third-party service provider, the server(s) 1010 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 10. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1006 (e.g., mobile device or conventional personal computer (PC)) based on instructions transmitted to and from the server(s) 1002 (which, in such an example can be called a "messaging server"). In some instances, the messaging application can include a payment application with messaging capability that enables users of the payment application to communicate with one another. In such instances, the payment application can be executed on a user device 1006 based on instructions transmitted to and from the server(s) 1002 (e.g., the payment service discussed in this description or another payment service that supports payment transactions). In some examples, the messaging application can be provided by a third-party service provider associated with the server(s) 1010. In examples where the messaging application is a third-party service provider, the server(s) 1010 can be accessible via one or more APIs or other integrations.

As described above, the service provider can facilitate peer-to-peer transactions, which can enable users 1006 to transfer fiat currency, non-fiat currency, cryptocurrency, securities, or other assets, or portions thereof, to other users 1006. In at least one example, individual users can be associated with user accounts. Additional details associated with user accounts and the transfer of assets between users 1006 are described below with reference to FIG. 11.

Furthermore, the service provider of FIG. 10 can enable users 1006 to perform banking transactions via instances of the payment application 1018. For example, users can configure direct deposits or other deposits for adding assets to their various ledgers/balances. Further, users 1006 can configure bill pay, recurring payments, and/or the like using assets associated with their accounts. In addition to sending and/or receiving assets via peer-to-peer transactions, users 1006 buy and/or sell assets via asset networks such as cryptocurrency networks, securities networks, and/or the like.

FIG. 11 illustrates example data store(s) 1100 that can be associated with the server(s) 1002.

In at least one example, the data store(s) 1100 can store assets in an asset storage 1102, as well as data in user account(s) 1104, merchant account(s) 1106, and/or customer account(s) 1108. In at least one example, the asset storage 1102 can be used to store assets managed by the service provider of FIG. 11. In at least one example, the asset storage 1102 can be used to record whether individual of the assets are registered to users. For example, the asset storage 1102 can include an asset wallet 1110 for storing records of assets owned by the service provider of FIG. 11, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1010 can be associated therewith. In some examples, the asset wallet 1110 can communication with the asset network via one or more components associated with the server(s) 1002.

The first user asset account(s) 170, the second user asset account(s) 172, and/or the service asset account(s) 174 may be examples of the user account 1120, the asset wallet 1140, and/or the asset wallet 1110, and/or may be associated with the fiat currency ledger 1114, the fiat currency ledger 1136, the asset ledger 1112, the asset ledger 1134, and/or the private blockchain 1119.

The asset wallet 1110 can be associated with one or more addresses and can vary addresses used to acquire assets (e.g., from the asset network(s)) so that its holdings are represented under a variety of addresses on the asset network. In examples where the service provider of FIG. 10 has its own holdings of cryptocurrency (e.g., in the asset wallet 1110), a user can acquire cryptocurrency directly from the service provider of FIG. 10. In some examples, the service provider of FIG. 10 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1102 may contain ledgers that store records of assignments of assets to users 1006. Specifically, the asset storage 1102 may include asset wallet 1110 (e.g., asset ledger), fiat currency ledger 1114, and other ledger(s) 1116, which can be used to record transfers of assets between users 1006 of the service provider and/or one or more third-parties (e.g., merchant network(s), payment card network(s), ACH network(s), equities network(s), the asset network, securities networks, etc.). In doing so, the asset storage 1102 can maintain a running balance of assets managed by the service provider of FIG. 10. The ledger(s) of the asset storage 1102 can further indicate some of the running balance for each of the ledger(s) stored in the asset storage 1102 is assigned or registered to one or more user account(s) 1104.

In at least one example, the asset storage 1102 can include transaction logs 1118, which can include records of past transactions involving the service provider of FIG. 10. In at least one example, transaction data, as described herein, can be stored in association with the transaction logs 1118.

In some examples, the data store(s) 1100 can store a private blockchain 1119. A private blockchain 1119 can function to record sender addresses, recipient addresses, public keys, values of cryptocurrency transferred, and/or can be used to verify ownership of cryptocurrency tokens to be transferred. In some examples, the service provider of FIG. 10 can record transactions taking place within the service provider of FIG. 10 involving cryptocurrency until the number of transactions has exceeded a determined limit (e.g., number of transactions, storage space allocation, etc.). Based at least in part on determining that the limit has been reached, the service provider of FIG. 10 can publish the transactions in the private blockchain 1119 to a public blockchain (e.g., associated with the asset network), where miners can verify the transactions and record the transactions to blocks on the public blockchain. In at least one example, the service provider of FIG. 10 can participate as miner(s) at least for its transactions to be posted to the public blockchain.

In at least one example, the data store(s) 1100 can store and/or manage accounts, such as user account(s) 1104, merchant account(s) 1106, and/or customer account(s) 1108. In at least one example, the user account(s) 1104 may store records of user accounts associated with the users 1006. In at least one example, the user account(s) 1104 can include a user account 1120, which can be associated with a user (of the users 1006). Other user accounts of the user account(s) 1104 can be similarly structured to the user account 1120, according to some examples. In other examples, other user accounts may include more or less data and/or account information than that provided by the user account 1120. In at least one example, the user account 1120 can include user account data 1128, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1128 can include account activity 1130 and user wallet key(s) 1132. The account activity 1130 may include a transaction log for recording transactions associated with the user account 1120. In some examples, the user wallet key(s) 1132 can include a public-private key-pair and a respective address associated with the asset network or other asset networks. In some examples, the user wallet key(s) 1132 may include one or more key pairs, which can be unique to the asset network or other asset networks.

In addition to the user account data 1128, the user account 1120 can include ledger(s) for account(s) managed by the service provider of FIG. 10, for the user. For example, the user account 1120 may include an asset ledger 1134, a fiat currency ledger 1136, and/or one or more other ledgers 1138. The ledger(s) can indicate that a corresponding user utilizes the service provider of FIG. 10 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 10.

In some examples, the asset ledger 1134 can store a balance for each of one or more cryptocurrencies (e.g., Bitcoin, Ethereum, Litecoin, etc.) registered to the user account 1120. In at least one example, the asset ledger 1134 can further record transactions of cryptocurrency assets associated with the user account 1120. For example, the user account 1120 can receive cryptocurrency from the asset network using the user wallet key(s) 1132. In some examples, the user wallet key(s) 1132 may be generated for the user upon request. User wallet key(s) 1132 can be requested by the user in order to send, exchange, or otherwise control the balance of cryptocurrency held by the service provider of FIG. 10 (e.g., in the asset wallet 1110) and registered to the user. In some examples, the user wallet key(s) 1132 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 10 and the value is credited as a balance in asset ledger 1134), by purchasing currency in the form associated with the account using currency in a different form (e.g., buying a value of cryptocurrency from the service provider of FIG. 10 using a value of fiat currency reflected in fiat currency ledger 1136, and crediting the value of cryptocurrency in asset ledger 1134), or by conducting a transaction with another user (customer or merchant) of the service provider of FIG. 10 wherein the account receives incoming currency (which can be in the form associated with the account or a different form, in which the incoming currency may be converted to the form associated with the account). In some examples, the user account data 1128 can include preferences for maintaining balances of individual of the ledgers. For example, the service provider of FIG. 10 can automatically debit the fiat currency ledger 1136 to increase the asset ledger 1134, or another account associated with the user whenever the cryptocurrency balance (e.g., of the asset ledger 1134) falls below a stated level (e.g., a threshold). Conversely, in some embodiments, the service provider of FIG. 10 can automatically credit the fiat currency ledger 1136 to decrease the asset ledger 1134 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with third-party server(s)) unrelated to the service provider of FIG. 10 (i.e., an external account). In at least one example, the user can transfer all or a portion of a balance of the cryptocurrency stored in the third-party cryptocurrency wallet to the service provider of FIG. 10. Such a transaction can require the user to transfer an amount of the cryptocurrency in a message signed by user's private key to an address provided by the service provider of FIG. 10. In at least one example, the transaction can be sent to miners to bundle the transaction into a block of transactions and to verify the authenticity of the transactions in the block. Once a miner has verified the block, the block is written to a public, distributed blockchain where the service provider of FIG. 10 can then verify that the transaction has been confirmed and can credit the user's asset ledger 1134 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 10. As described above, in some examples, the service provider of FIG. 10 can acquire cryptocurrency from a third-party source (e.g., associated with third-party server(s)). In such examples, the asset wallet 1110 can be associated with different addresses and can vary addresses used to acquire cryptocurrency so that its holdings are represented under a variety of addresses on a blockchain. When the service provider of FIG. 10 has their own holdings of cryptocurrency, users can acquire cryptocurrency directly from the service provider of FIG. 10. In some examples, the service provider of FIG. 10 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 10 has its own cryptocurrency assets, cryptocurrency transferred in a transaction (e.g., data with address provided for receipt of transaction and a balance of cryptocurrency transferred in the transaction) can be stored in the asset wallet 1110. In at least one example, the service provider of FIG. 10 can credit the asset ledger 1134 of the user. Additionally, while the service provider of FIG. 10 recognizes that the user retains the value of the transferred cryptocurrency through crediting the asset ledger 1134, any person that inspects the blockchain will see the cryptocurrency as having been transferred to the service provider of FIG. 10. In some examples, the asset wallet 1110 can be associated with many different addresses. In such examples, any person that inspects the blockchain may not easily associate all cryptocurrency stored in asset wallet 1110 as belonging to the same entity. It is this presence of a private ledger that is used for real-time transactions and maintained by the service provider of FIG. 10, combined with updates to the public ledger at other times, that allows for extremely fast transactions using cryptocurrency to be achieved. In some examples, the "private ledger" can refer to the asset wallet 1110 (e.g., asset ledger), which in some examples, can utilize the private blockchain 1119, as described herein. The "public ledger" can correspond to a public blockchain associated with the asset network.

In at least one example, a user's asset ledger 1134, fiat currency ledger 1136, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1134. In some examples, a user can receive fiat currency or another currency in the form of payment for a transaction with another user. In at least one example, at least a portion of such funds can be converted into cryptocurrency by the service provider of FIG. 10 and used to fund the asset ledger 1134 of the user.

As addressed above, in some examples, users can also have other accounts maintained by the service provider of FIG. 10. For example, a user can also have an account in U.S. dollars, which can be tracked, for example, via the fiat currency ledger 1136. Such an account can be funded by transferring money from a bank account at a third-party bank to an account maintained by the service provider of FIG. 10 as is conventionally known. In some examples, a user can receive fiat currency in the form of payment for a transaction with another user. In such examples, at least a portion of such funds can be used to fund the fiat currency ledger 1136.

In some examples, a user can have one or more internal payment cards registered with the service provider of FIG. 10. Internal payment cards can be linked to one or more of the accounts associated with the user account 1120. In some embodiments, options with respect to internal payment cards can be adjusted and managed using an application (e.g., the payment application 1018).

In at least one example, as described above, each ledger can correspond to an account of the user that is managed by the service provider of FIG. 10. In at least one example, individual of the accounts can be associated with a wallet or a stored balance for use in payment transactions, peer-to-peer transactions, payroll payments, etc.

In at least one example, the user account 1120 can be associated with an asset wallet 1140. The asset wallet 1140 of the user can be associated with account information that can be stored in the user account data 1128 and, in some examples, can be associated with the user wallet key(s) 1132. In at least one example, the asset wallet 1140 can store data indicating an address provided for receipt of a cryptocurrency transaction. In at least one example, the balance of the asset wallet 1140 can be based at least in part on a balance of the asset ledger 1134. In at least one example, funds availed via the asset wallet 1140 can be stored in the asset wallet 1140 or the asset wallet 1110. Funds availed via the asset wallet 1110 can be tracked via the asset ledger 1134. The asset wallet 1140, however, can be associated with additional cryptocurrency funds.

In at least one example, when the service provider of FIG. 10 includes a private blockchain 1119 for recording and validating cryptocurrency transactions, the asset wallet 1140 can be used instead of, or in addition to, the asset ledger 1134. For example, at least one example, a merchant can provide the address of the asset wallet 1140 for receiving payments. In an example where a customer is paying in cryptocurrency and the customer has their own cryptocurrency wallet account associated with the service provider of FIG. 10, the customer can send a message signed by its private key including its wallet address (i.e., of the customer) and identifying the cryptocurrency and value to be transferred to the merchant's asset wallet 1140. The service provider of FIG. 10 can complete the transaction by reducing the cryptocurrency balance in the customer's cryptocurrency wallet and increasing the cryptocurrency balance in the merchant's asset wallet 1140. In addition to recording the transaction in the respective cryptocurrency wallets, the transaction can be recorded in the private blockchain 1119 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can require a user to transfer an amount of cryptocurrency in a message signed by the user's private key to an address of the cryptocurrency wallet account. The transferred amount of cryptocurrency can then be within the cryptocurrency wallet account for use in later transactions.

While the asset ledger 1134 and/or asset wallet 1140 are each described above with reference to cryptocurrency, the asset ledger 1134 and/or asset wallet 1140 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 10 is an aspect of the technology disclosed that enables technical advantages of increased processing speed and improved security.

Figure 12:
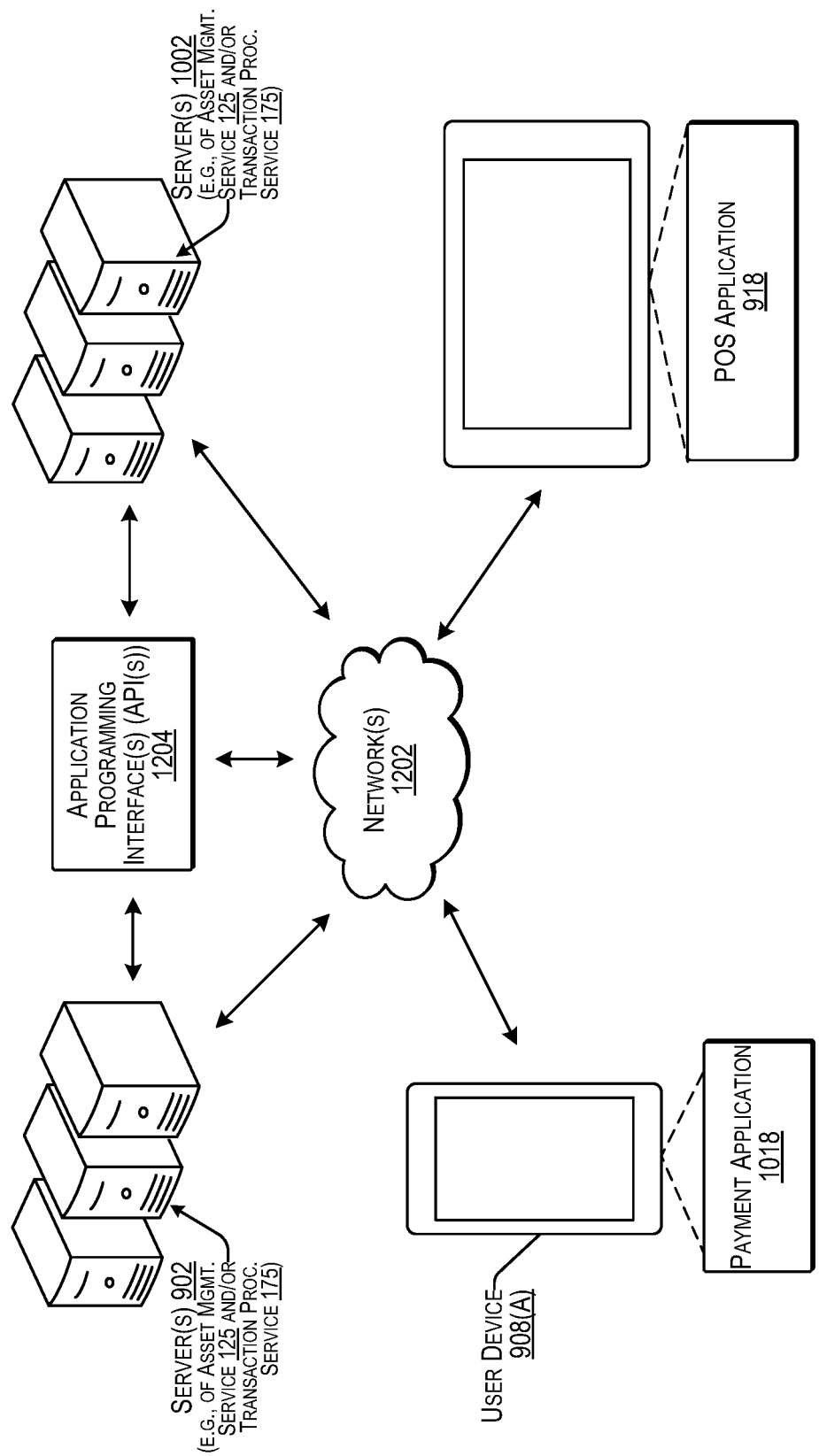
FIG. 12 is a block diagram illustrating an example environment wherein the environment of FIG. 9 and the environment of FIG. 10 can be integrated to enable payments at the point-of-sale using assets associated with user accounts in the peer-to-peer environment of FIG. 10, in accordance with some examples.

FIG. 12 illustrates an example environment 1200 wherein the environment 900 of FIG. 9 and the environment 1000 of FIG. 10 can be integrated to enable payments at the point-of-sale using assets associated with user accounts in the peer-to-peer environment 9010 of FIG. 10. As illustrated, each of the components can communicate with one another via one or more networks 1202. In some examples, one or more APIs 1204 or other functional components can be used to facilitate such communication.

In at least one example, the example environment 1200 can enable contactless payments, via integration of peer-to-peer payment, or other payment making, platform(s) and payment processing platform(s), are described herein. For the purpose of FIG. 12, the environment 900 can refer to a payment processing platform and the environment 1000 can refer to a peer-to-peer payment, or payment making, platform. In an example, such an integration can enable a customer to participate in a transaction via their own computing device instead of interacting with a merchant device of a merchant, such as the merchant device 908(A). In such an example, the POS application 918, associated with a payment processing platform and executable by the merchant device 908(A) of the merchant, can present a Quick Response (QR) code, or other code that can be used to identify a transaction (e.g., a transaction code), in association with a transaction between the customer and the merchant. The QR code, or other transaction code, can be provided to the POS application 918 via an API associated with the peer-to-peer payment platform. In an example, the customer can utilize their own computing device, such as the user device 1008(A), to capture the QR code, or the other transaction code, and to provide an indication of the captured QR code, or other transaction code, to server(s) 902 and/or server(s) 1002.

Based at least in part on the integration of the peer-to-peer payment platform and the payment processing platform (e.g., via the API), the server(s) 902 and/or 1002 associated with each can exchange communications with each other—and with a payment application 1018 associated with the peer-to-peer payment platform and/or the POS application 918—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1008(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 918 and the payment application 1018, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 908(A) can present a QR code, or other transaction code, that can be associated with a peer-to-peer payment platform. The customer can use a camera associated with the user device 1008(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 918 can cause a text message with a resource locator (e.g., uniform resource locator (URL)) that can be associated with a peer-to-peer payment platform to be sent to the user device 1008(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction-between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 918 of a merchant device 908(A) at a brick-and-mortar store of a merchant to a payment application 1018 of a user device 1008(A) of a customer to enable the customer to participate in a transaction via their own computing device. For instance, in a "scan to pay" example as described above, based at least in part on capturing the QR code, or other transaction code, via the user device 1008(A), the payment processing platform can provide transaction data to the peer-to-peer payment platform for presentation via the payment application 1018 on the user device 1008(A). In some examples, the customer can watch items being added to their cart (e.g., via a user interface presented via the payment application). As an item is added to a virtual cart by the merchant—via the POS application 918 on the merchant device 908(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1018 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1008(A) during or after payment of the transaction.

In some examples, based at least in part on capturing a transaction code, the payment processing platform can provide transaction data to the peer-to-peer payment platform for presentation via the payment application 1018 on the computing device of the customer, such as the user device 1008(A), to enable the customer to complete the transaction via their own computing device. In some examples, in response to receiving an indication that the transaction code has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the transaction code has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1018 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the transaction code is captured by the computing device of the customer prior to a payment selection user interface being presented via the POS application 918, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a transaction code is integrated into a payment application 1018 (e.g., instead of a native camera, or other sensor), techniques described herein can utilize an indication of the transaction code received from the payment application for two-factor authentication to enable more secure payments.

It should be noted that, while techniques described herein are directed to contactless payments using transaction codes, in additional or alternative examples, techniques described herein can be applicable for contact payments. That is, in some examples, instead of scanning, capturing, or otherwise interacting with a transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 13:
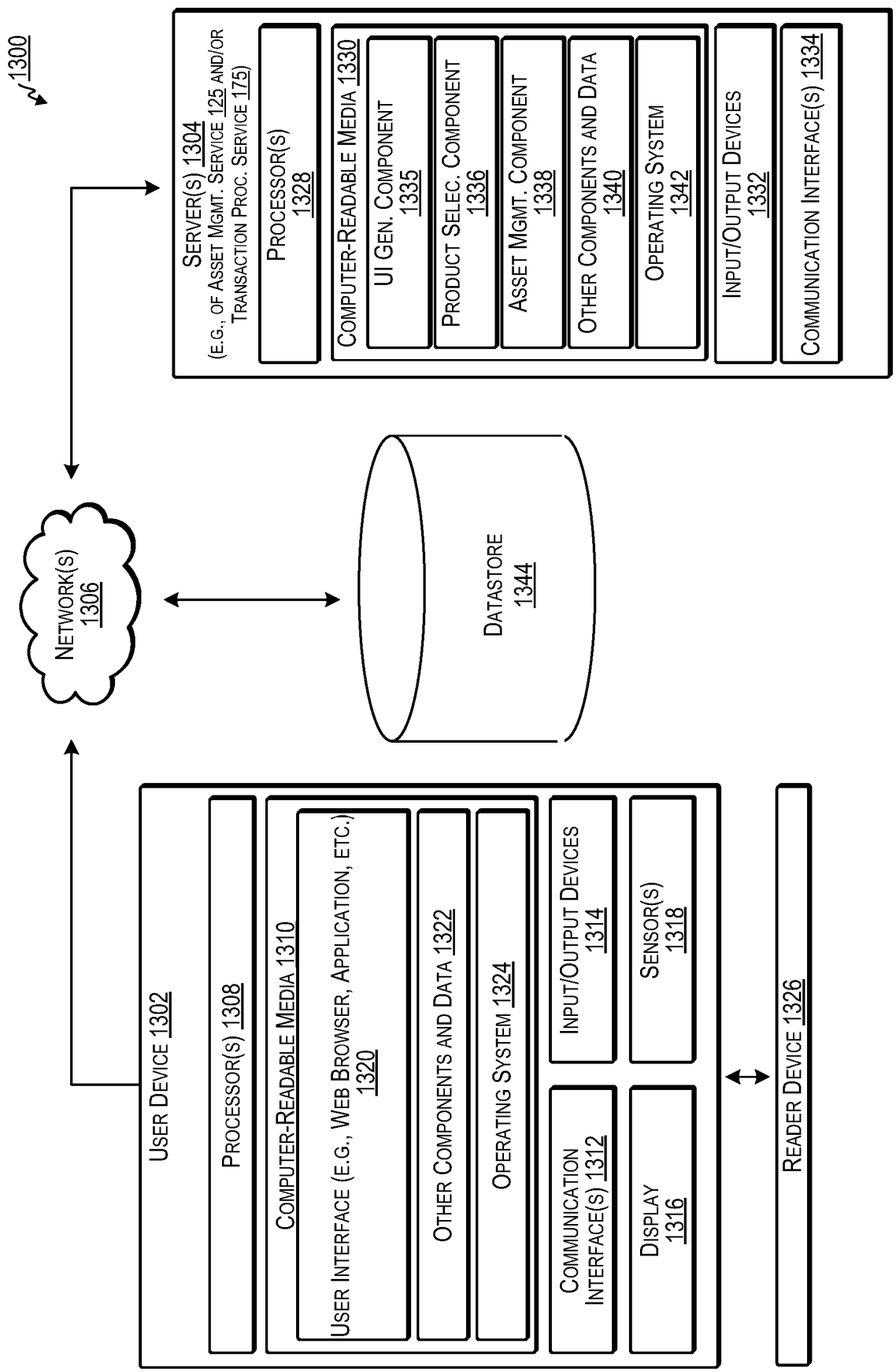
FIG. 13 is a block diagram illustrating a system for performing techniques described herein, in accordance with some examples.

FIG. 13 shows a block diagram illustrating a system 1300 for performing techniques described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, components or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include a UI generation component 1335 to generate the customized UI 140, a product selection component 1336 to perform at least a portion of the selection of the product or service 145 from a broader set of products or services, an asset management component 1338 to process a transfer 195, and other components and data 1340. For instance, the server(s) 1304 can use the UI generation component 1335 to generate the customized UI 140 to be relevant to a user of the user device 1302 for a product that is relevant to the user (e.g., as identified by the product selection component 1336), can provide the customized UI 140 to the user device 1302, and, in response to an input at the customized UI 140 from the user device 1302, can facilitate (e.g., via the asset management component 1340) interaction(s) with a transaction processing service 175 to manage at least one asset of the user.

Depending on the type of the user device 1302, the computer-readable media 1310 can also optionally include other functional components and data, such as other components and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some example, the GPS device can be used to identify a location of a user. In at least one example, the location of the user can be used by a service provider to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users when they enter a brick-and-mortar store of a merchant. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1326 may also include a biometric sensor to receive and process biometric characteristics and process them as payment instruments, given that such biometric characteristics are registered with the asset management system 100 and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more components and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one component for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1206, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program components, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider and/or payment processing service. Functional components stored in the computer-readable media 1330 can optionally include a UI generation component 1335 to generate the customized UI 140, a product selection component 1336 to perform at least a portion of the selection of the product or service 145 from a broader set of products or services, an asset management component 1338 to process the transfer 195, and other components and data 1340. For instance, the server(s) 1304 can use the UI generation component 1335 to generate the customized UI 140 to be relevant to a user of the user device 1302 for a product that is relevant to the user (e.g., as identified by the product selection component 1336), can provide the customized UI 140 to the user device 1302, and, in response to an input at the customized UI 140 from the user device 1302, can facilitate (e.g., via the asset management component 1340) interaction(s) with a transaction processing service 175 to manage at least one asset of the user.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1342 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the payee currency account(s) 170, the payee security asset account(s) 172, and the payee cryptocurrency account(s) 174, described above with reference to FIG. 1, can include or be associated with the merchant profiles and/or customer profiles described above.

Furthermore, in at least one example, the datastore 1344 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1344 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A method implemented by at least one computing device of a payment service, the method comprising:

receiving, by the at least one computing device, contextual information regarding an interaction between the payment service and a user device associated with a user;

determining, by the at least one computing device and based at least in part on inputting the contextual information into a trained machine learning (ML) model, at least one of a propensity metric or a value metric for the user, wherein the trained ML model is trained based on one or more propensity signals;

dynamically configuring, by the at least one computing device and based at least in part on the propensity metric, a user interface to enable the user to access data associated with a user account, wherein the configuring comprises arranging user interface elements on the user interface in a layout personalized for the user and based at least in part on the propensity metric, wherein each user interface element represents content particular to a service offered by the payment service, the payment service offering multiple services including the service;

based at least in part on receiving an indication of an interaction with a user interface element, associating an applet corresponding to a selected service with which the user interface element is associated with the user account, the applet configured to initialize an onboarding flow associated with enabling the user to access or add the selected service to the user account; and in response to the applet initializing the onboarding flow, launching the onboarding flow associated with the selected service, wherein content included in the onboarding flow is customized based at least in part on the contextual information associated with the user or the selected service.

2. The method of claim 1, further comprising:

selecting, by the at least one computing device, a booklet that is relevant to the user for a specified product that is relevant to the user from a plurality of booklets based on respective booklet engagement information associated with the plurality of booklets, wherein the respective booklet engagement information associated with the plurality of booklets is determined at least in part by inputting the contextual information into at least a second trained ML model for booklet analysis; and outputting, by the at least one computing device, a recommendation for the specified product to a device associated with the user, wherein the recommendation is based on the booklet for the specified product and for the user.

3. The method of claim 2, further comprising:

receiving the contextual information regarding the interaction between the payment service and the user device, the contextual information comprising at least one of an internet protocol (IP)-based transaction signal, an IP-based instrument link signal, or an IP-based fraud event signal; and generating the booklet that is relevant to the user based on respective booklet engagement information based on the second trained ML model, wherein the booklet is generated based on one or more of text-based attributes, image-based attributes, video-based attributes, or booklet content identified by the second trained ML model.

4. The method of claim 1, wherein the propensity metric corresponds to a likelihood of use of the service offered by the payment service, a value of the service offered by the payment service, and a risk associated with the service offered by the payment service.

5. The method of claim 1, wherein the contextual information comprises social networking signals associated with the user.

6. The method of claim 1, wherein the one or more propensity signals include historical user onboarding information.

7. The method of claim 1, wherein the contextual information decays in strength after a period of time.

8. A system associated with a payment service comprising:

one or more processors; and one or more non-transitory computer-readable media storing instructions executable by the one or more processors, wherein the instructions cause the one or more processors to perform acts comprising:

receiving contextual information regarding an interaction between the payment service and a user device associated with a user;

determining, based at least in part on inputting the contextual information into a trained machine learning (ML) model, at least one of a propensity metric or a value metric for the user, wherein the trained ML model is trained based on one or more propensity signals;

dynamically configuring, based at least in part on the propensity metric, a user interface to enable the user to access data associated with a user account, wherein the configuring comprises arranging user interface elements on the user interface in a layout personalized for the user and based at least in part on the propensity metric, wherein each user interface element represents content particular to a service offered by the payment service, the payment service offering multiple services including the service;

based at least in part on receiving an indication of an interaction with a user interface element, associating an applet corresponding to a selected service with which the user interface element is associated with the user account, the applet configured to initialize an onboarding flow associated with enabling the user to access or add the selected service to the user account; and in response to the applet initializing the onboarding flow, launching the onboarding flow associated with the selected service, wherein content included in the onboarding flow is customized based at least in part on the contextual information associated with the user or the selected service.

9. The system of claim 8, the acts further comprising:

selecting a booklet that is relevant to the user for a specified product that is relevant to the user from a plurality of booklets based on respective booklet engagement information associated with the plurality of booklets, wherein the respective booklet engagement information associated with the plurality of booklets is determined at least in part by inputting the contextual information into at least a second trained ML model for booklet analysis; and outputting a recommendation for the specified product to a device associated with the user, wherein the recommendation is based on the booklet for the specified product and for the user.

10. The system of claim 9, the acts further comprising:
- receiving the contextual information regarding the interaction between the payment service and the user device, the contextual information comprising at least one of an internet protocol (IP)-based transaction signal, an IP-based instrument link signal, or an IP-based fraud event signal; and
- generating the booklet that is relevant to the user based on respective booklet engagement information based on the second trained ML model, wherein the booklet is generated based on one or more of text-based attributes, image-based attributes, video-based attributes, or booklet content identified by the second trained ML model.

11. The system of claim 8, wherein the propensity metric corresponds to a likelihood of use of the service offered by the payment service, a value of the service offered by the payment service, and a risk associated with the service offered by the payment service.

12. The system of claim 8, wherein the contextual information comprises social networking signals associated with the user.

13. The system of claim 8, wherein the one or more propensity signals include historical user onboarding information.

14. The system of claim 8, wherein the contextual information decays in strength after a period of time.

15. One or more non-transitory computer-readable media storing instructions executable by one or more processors that, when executed by the one or more processors, cause the one or more processors to perform acts comprising:
- receiving contextual information regarding an interaction between a payment service and a user device associated with a user;
- determining, based at least in part on inputting the contextual information into a trained machine learning (ML) model, at least one of a propensity metric or a value metric for the user, wherein the trained ML model is trained based on one or more propensity signals;
- dynamically configuring, based at least in part on the propensity metric, a user interface to enable the user to access data associated with a user account, wherein the configuring comprises arranging user interface elements on the user interface in a layout personalized for the user and based at least in part on the propensity metric, wherein each user interface element represents content particular to a service offered by the payment service, the payment service offering multiple services including the service;
- based at least in part on receiving an indication of an interaction with a user interface element, associating an applet corresponding to a selected service with which the user interface element is associated with the user account, the applet configured to initialize an onboarding flow associated with enabling the user to access or add the selected service to the user account; and
- in response to the applet initializing the onboarding flow, launching the onboarding flow associated with the selected service, wherein content included in the onboarding flow is customized based at least in part on the contextual information associated with the user or the selected service.

16. The one or more non-transitory computer-readable media of claim 15, the acts further comprising:
- selecting a booklet that is relevant to the user for a specified product that is relevant to the user from a plurality of booklets based on respective booklet engagement information associated with the plurality of booklets, wherein the respective booklet engagement information associated with the plurality of booklets is determined at least in part by inputting the contextual information into at least a second trained ML model for booklet analysis; and
- outputting a recommendation for the specified product to a device associated with the user, wherein the recommendation is based on the booklet for the specified product and for the user.

17. The one or more non-transitory computer-readable media of claim 16, the acts further comprising:
- receiving the contextual information regarding the interaction between the payment service and the user device, the contextual information comprising at least one of an internet protocol (IP)-based transaction signal, an IP-based instrument link signal, or an IP-based fraud event signal; and
- generating the booklet that is relevant to the user based on respective booklet engagement information based on the second trained ML model, wherein the booklet is generated based on one or more of text-based attributes, image-based attributes, video-based attributes, or booklet content identified by the second trained ML model.

18. The one or more non-transitory computer-readable media of claim 15, wherein the propensity metric corresponds to a likelihood of use of the service offered by the payment service, a value of the service offered by the payment service, and a risk associated with the service offered by the payment service.

19. The one or more non-transitory computer-readable media of claim 15, wherein the contextual information comprises social networking signals associated with the user.

20. The one or more non-transitory computer-readable media of claim 15, wherein the one or more propensity signals include historical user onboarding information.

* * * * *